(12) United States Patent
Dropps et al.

(10) Patent No.: US 7,613,816 B1
(45) Date of Patent: Nov. 3, 2009

(54) METHOD AND SYSTEM FOR ROUTING NETWORK INFORMATION

(75) Inventors: Frank R Dropps, Maple Grove, MN (US); Edward C Ross, Edina, MN (US); Ernest G Kohlwey, Eagan, MN (US); Craig M Verba, Maple Grove, MN (US); Gary M Papenfuss, St. Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 336 days.

(21) Appl. No.: 11/560,317

(22) Filed: Nov. 15, 2006

(51) Int. Cl.
G06F 15/16 (2006.01)
G06F 15/173 (2006.01)

(52) U.S. Cl. .................. 709/230; 709/239; 709/242; 709/247

(58) Field of Classification Search .............. 709/230, 709/238, 249
See application file for complete search history.

(56) References Cited

U.S. PATENT DOCUMENTS

| | | | |
|---|---|---|---|
| 4,162,375 A | 7/1979 | Schilichte | |
| 4,425,640 A | 1/1984 | Philip et al. | |
| 4,546,468 A | 10/1985 | Christmas et al. | |
| 4,569,043 A | 2/1986 | Simmons et al. | |
| 4,725,835 A | 2/1988 | Schreiner et al. | |
| 4,821,034 A | 4/1989 | Anderson et al. | |
| 5,144,622 A | 9/1992 | Takiyasu et al. | |
| 5,367,520 A | 11/1994 | Cordell | |
| 5,598,541 A | 1/1997 | Malladi et al. | |
| 5,610,745 A | 3/1997 | Bennett | |
| 5,687,172 A | 11/1997 | Cloonan et al. | |
| 5,748,612 A | 5/1998 | Stoevhase et al. | |
| 5,818,842 A | 10/1998 | Burwell et al. | |
| 5,894,560 A | 4/1999 | Carmichael et al. | |

(Continued)

FOREIGN PATENT DOCUMENTS

EP  0649098  4/1995

(Continued)

OTHER PUBLICATIONS

"Fibre Channel Generic Services—3 (FC-GS-3) Rev. 7.01, NCITS Working Draft Proposed American National Standard for Information Technology,", *T11/Project 1356 D/Rev 7.01*, (Nov. 28, 2000).

(Continued)

*Primary Examiner*—Ario Etienne
*Assistant Examiner*—Blake Rubin
(74) *Attorney, Agent, or Firm*—Klein, O'Neill & Singh, LLP

(57) ABSTRACT

Method and system for processing frames in a Fibre Channel network is provided. The method includes receiving a frame at a receive port; determining if a translation cache is enabled; determining if there is a match between a received frame header and an entry in the translation cache; generating an encapsulation signal, a de-encapsulation signal, a translation signal or a routing signal; removing data words in the received frame header, if de-encapsulation signal is set; translating the received frame header, if the translation signal is set; encapsulating the frame with an encapsulation header, if the encapsulation signal is set; and routing the frame using translation cache routing if the routing signal is set.

17 Claims, 17 Drawing Sheets

U.S. PATENT DOCUMENTS

| | | | |
|---|---|---|---|
| 5,987,028 | A | 11/1999 | Yang et al. |
| 5,999,528 | A | 12/1999 | Chow et al. |
| 6,014,383 | A | 1/2000 | McCarty |
| 6,021,128 | A | 2/2000 | Hosoya et al. |
| 6,047,323 | A | 4/2000 | Krause |
| 6,081,512 | A | 6/2000 | Muller et al. |
| 6,118,776 | A | 9/2000 | Berman |
| 6,128,292 | A | 10/2000 | Kim et al. |
| 6,144,668 | A | 11/2000 | Bass et al. |
| 6,160,813 | A | 12/2000 | Banks et al. |
| 6,185,203 | B1 | 2/2001 | Berman |
| 6,308,220 | B1 | 10/2001 | Mathur |
| 6,314,477 | B1 * | 11/2001 | Cowger et al. ............... 710/22 |
| 6,324,181 | B1 | 11/2001 | Wong et al. |
| 6,330,236 | B1 | 12/2001 | Ofek et al. |
| 6,343,324 | B1 | 1/2002 | Hubis et al. |
| 6,353,612 | B1 | 3/2002 | Zhu et al. |
| 6,370,605 | B1 * | 4/2002 | Chong, Jr. ............... 710/33 |
| 6,397,356 | B1 | 5/2002 | Yonezawa |
| 6,411,599 | B1 | 6/2002 | Blanc et al. |
| 6,424,658 | B1 | 7/2002 | Mathur |
| 6,449,274 | B1 | 9/2002 | Holden et al. |
| 6,467,008 | B1 | 10/2002 | Gentry et al. |
| 6,581,166 | B1 | 6/2003 | Hirst et al. |
| 6,597,691 | B1 | 7/2003 | Anderson et al. |
| 6,597,777 | B1 | 7/2003 | Ho |
| 6,697,359 | B1 | 2/2004 | George |
| 6,760,302 | B1 | 7/2004 | Ellinas et al. |
| 6,904,053 | B1 * | 6/2005 | Berman ............... 370/466 |
| 6,941,357 | B2 | 9/2005 | Nguyen et al. |
| 2001/0038628 | A1 | 11/2001 | Ofek et al. |
| 2002/0034178 | A1 | 3/2002 | Schmidt et al. |
| 2002/0196773 | A1 | 12/2002 | Berman |
| 2003/0016683 | A1 | 1/2003 | George et al. |
| 2003/0046396 | A1 | 3/2003 | Richter et al. |
| 2003/0056000 | A1 | 3/2003 | Mullendore et al. |
| 2003/0091062 | A1 | 5/2003 | Lay et al. |
| 2003/0120983 | A1 | 6/2003 | Vieregge et al. |
| 2003/0137941 | A1 | 7/2003 | Kaushik et al. |
| 2003/0179748 | A1 | 9/2003 | George et al. |
| 2003/0189935 | A1 | 10/2003 | Warden et al. |
| 2003/0210686 | A1 * | 11/2003 | Terrell et al. ............... 370/389 |
| 2003/0236953 | A1 | 12/2003 | Grieff et al. |
| 2004/0024831 | A1 | 2/2004 | Yang et al. |
| 2004/0028038 | A1 | 2/2004 | Anderson et al. |
| 2004/0141521 | A1 | 7/2004 | George et al. |
| 2005/0033878 | A1 * | 2/2005 | Pangal et al. ............... 710/36 |
| 2005/0281282 | A1 | 12/2005 | Gonzalez et al. |
| 2006/0023751 | A1 * | 2/2006 | Wilson et al. ............... 370/474 |
| 2006/0047852 | A1 | 3/2006 | Shah et al. |
| 2006/0074927 | A1 | 4/2006 | Sullivan et al. |

FOREIGN PATENT DOCUMENTS

| | | |
|---|---|---|
| EP | 0856969 | 8/1998 |
| WO | WO 98/36537 | 8/1998 |

OTHER PUBLICATIONS

"Fibre Channel Switch Fabric—2(FC-SW-2) Rev 5.4 NCITS Working Draft Proposed American National Standard for Information Technology", *T11/Project 1305-D/Rev 5.4*, (Jun. 2001).

Brown, Douglas W., "A State-Machine Synthesizer", *18th Design Automation Conference*, (1981),301-305.

Clark, Tom, "Zoning for Fibre Channel Fabrics", *Vixel Corporation Paper- XP002185194*, (Aug. 1999),1-6.

Curtis, A. R., "Design Considerations for 10-Gbit Fibre Channel", *Curtis A. Ridgeway, Distinguished I/O Architect, Storage and Computing ASIC's Division, LSI Logic Corp.*.

Desanti, "Virtual Fabrics", *Virtual Fabrics T11/03-352v0*, (May 2003),1-4.

Desanti, Claudio , "Virtual Fabrics Switch Suppport", *VF Switch Support, T11/04-395v2*, (Sep. 2004),1-15.

Malavalli, Kumar, "Distributed Computing With Fibre Channel Fabric", *Proc. of the Computer Soc. Int'l Conf.*, Los Alamitos, *IEEE Comp. Soc. Press.*, Vol. Conf. 37, XP000340745, (Feb. 24, 1992),269-274.

Malavalli, Kumar , "High Speed Fibre Channel Switching Fabric Services", *Proceedings of the SPIE, SPIE*, Bellingham, VA, USA vol. 1577,, XP000562869, ISSN: 0277-786X,(Sep. 4, 1991),216-226.

Martin, Charles R., "Fabric Interconnection of Fibre Channel Standard Nodes", *Proceedings of the SPIE*, (Sep. 8, 1992),65-71.

Martin, "Virtual Channel Architecture", *Presentation By Brocade to T11/03-369V0*, (Jun. 2, 2003).

Melhem, et al., "Minimizing Wavelength Conversions in WDM Path Establishment", *Computer Science Department, University of Pittsburgh*, Pittsburgh, PA 15260, (2001),197-211.

Pelissier, "Inter-Fabric Routing", *Inter Fabric Routing (04-520v0)*, (Jul. 30, 2004),1-31.

Ridgeway, Curt , "0GFC-40GFC using 4-lane XAUI's", *LSI Logic Presentation—T11/03-069v0*.

Yoshida, Hu , "LUN Security Considerations for Storage Area Networks", *Hitachi Data Systems Pager—XP 002185193* (1999), 1-4.

"Office Action from USPTO dated Oct. 4, 2007 for U.S. Appl. No. 10/894,627".

"Office Action from USPTO dated Apr. 14, 2008 for U.S. Appl. No. 10/894,627".

"Non-Final Office Action from USPTO dated Oct. 10, 2008 for U.S. Appl. No. 10/894,627".

"Notice of Allowance from USPTO dated May 26, 2009 for U.S. Appl. No. 10/894,627".

"Office Action from USPTO dated Jul. 13, 2009 for U.S. Appl. No. 11/680,485".

* cited by examiner

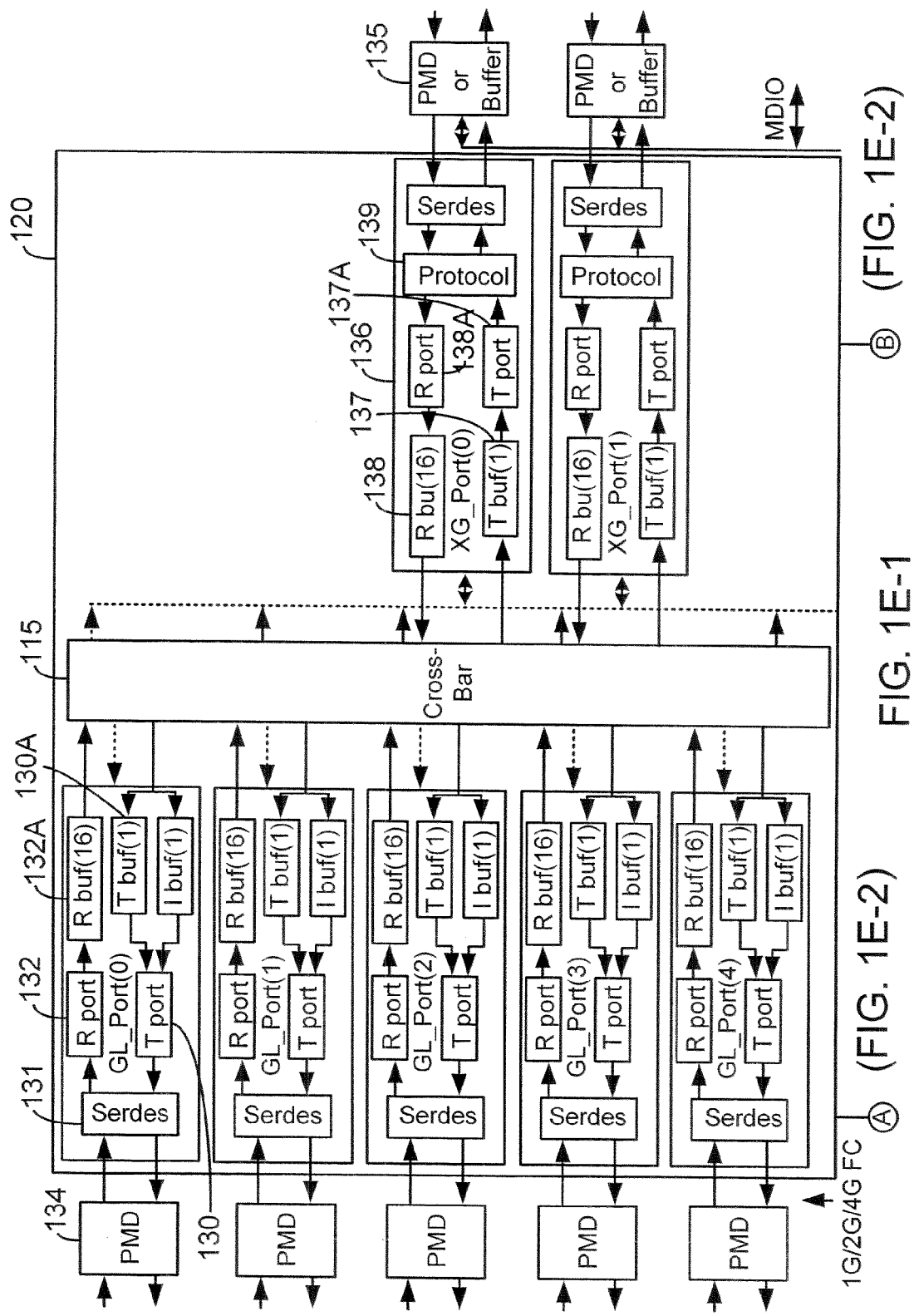

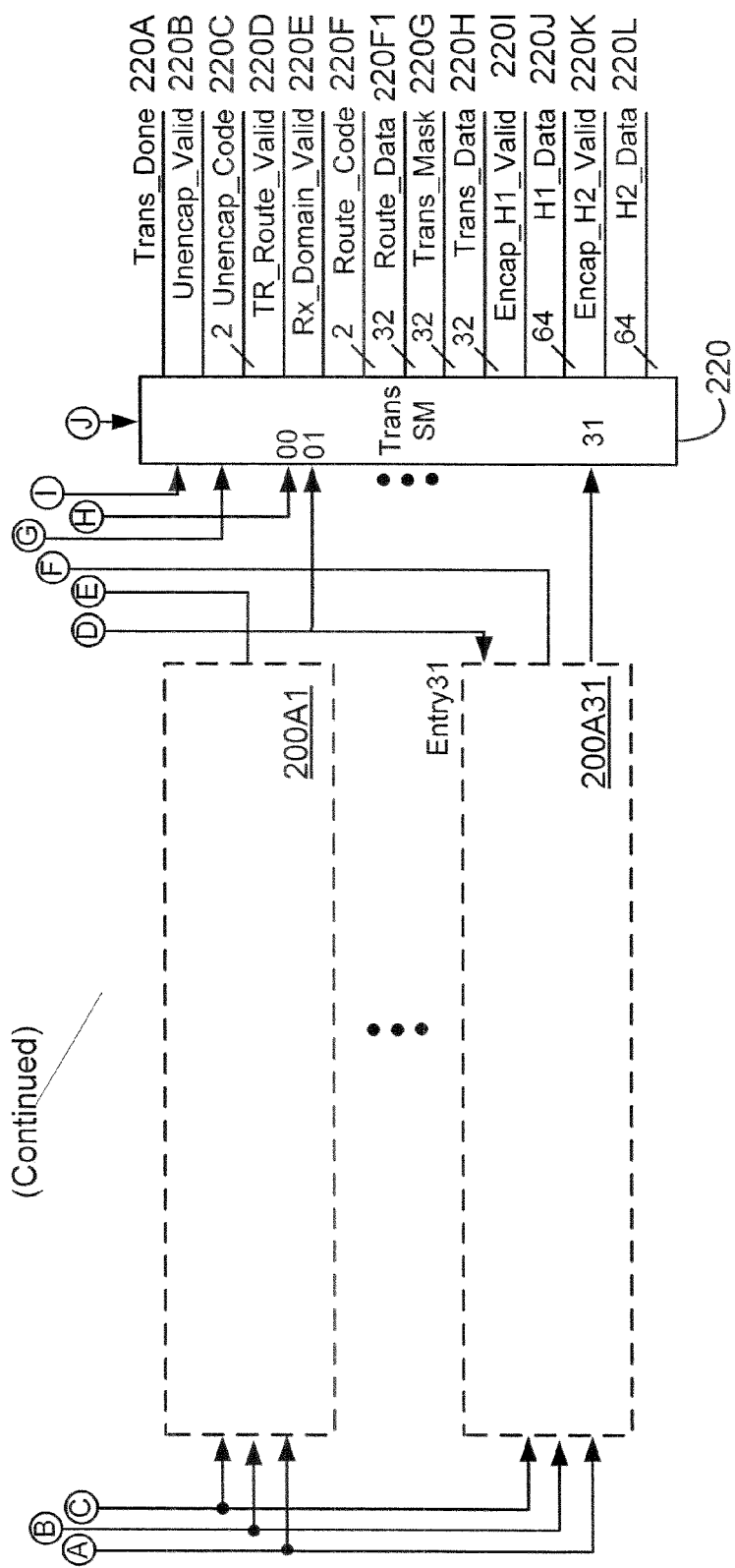
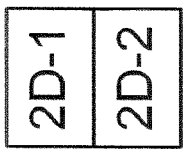
FIG. 2D-2
FIG. 2D

| Code | Received | Transmitted | Description of Translation Action |
|---|---|---|---|
| 00000 | Standard FC | Standard FC | No translation is performed |
| 00001 | Standard FC | Standard FC | D_ID and S_ID are translated |
| 00010 | Standard FC | VSAN Header | D_ID and S_ID are translated and a VSAN header is added |
| 00011 | Standard FC | IFR Header | D_ID and S_ID are translated and a inter-fabric routing header is added |
| 00100 | Standard FC | Enc Header | D_ID and S_ID are translated and a encapsulation extened routing header is added |
| 00101 | | | Reserved |
| 00110 | | | Reserved |
| 00111 | | | Reserved |
| 01000 | VSAN Header | VSAN Header | No translation is performed |
| 01001 | VSAN Header | Standard FC | D_ID and S_ID are translated and the VSAN header |
| 01010 | VSAN Header | VSAN Header | VSAN ID, D_ID and S_ID are translated (IVR) |
| 01011 | VSAN Header | IFR Header | D_ID and S_ID translated; inter-fabric routing header replaces the VSAN header |
| 01100 | VSAN Header | Enc Header | D_ID and S_ID translated; encapsulation extended header replaces the VSAN header |
| 01101 | | | Reserved |
| 01110 | | | Reserved |
| 01111 | | | Reserved |
| 10000 | IFR Header | IFR Header | No translation is performed |
| 10001 | IFR Header | Standard FC | D_ID and S_ID are translated and the inter-fabric routing header is removed |
| 10010 | IFR Header | VSAN Header | D_ID and S_ID are translated; VSAN header replaces the inter-fabric routing header |
| 10011 | IFR Header | IFR Header | The inter-fabric routing header. D_ID and S_ID are translated |
| 10100 | IFR Header | Enc Header | The fabric routing frame is encapsulated with a fabric EC routing header |
| 10101 | | | Reserved |
| 10110 | | | Reserved |
| 10111 | | | Reserved |
| 11000 | Enc Header | Enc Header | No translation is performed |
| 11001 | Enc Header | Standard FC | D_ID and S_ID are translated and the encapsulation extended header is removed |
| 11010 | Enc Header | VSAN Header | D_ID and S_ID translated; VSAN header replaces the encapsulation extended header |
| 11011 | Enc Header | IFR Header | D_ID and S_ID translated; IFR header replaces the encapsulation extended header |
| 11100 | Enc Header | Enc Header | The encapsulation extended header. D_ID and S_ID are translated |
| 11101 | | | Reserved |
| 11110 | | | Reserved |
| 11111 | | | Reserved |

FIG. 3

| 4A-1 | 4A-2 |

METHOD AND SYSTEM FOR ROUTING NETWORK INFORMATION

BACKGROUND

1. Field of the Invention

The present invention relates to networks, and more particularly, to routing and address translation in Fibre Channel networks.

2. Background of the Invention

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel standards are now being extended for use with expanded Fabrics and in storage virtualization. Storage virtualization defines virtual storage units for end-users and maps virtual storage units to actual physical storage locations.

Conventional Fibre Channel switches fail to provide a system and method that can efficiently support such expanded functionality and accommodate various addressing schemes that are required to enable a switch to function properly in Inter-Fabric and virtual Fabric routing.

Therefore, there is a need for a method and system for handling address translation for a Fibre Channel switch that may operate in different environments, for example, multiple Fabrics, virtual Fabrics and storage virtualization.

SUMMARY OF THE PRESENT INVENTION

In one aspect of the present invention, a method for processing frames in a Fibre Channel network is provided. The method includes receiving a frame at a receive port; determining if a translation cache is enabled; determining if there is a match between a received frame header and an entry in the translation cache; generating an encapsulation signal, a de-encapsulation signal, a translation signal or a routing signal; removing data words in the received frame header, if de-encapsulation signal is set; translating the received frame header, if the translation signal is set; encapsulating the frame with an encapsulation header, if the encapsulation signal is set; and routing the frame using translation cache routing if the routing signal is set.

In another aspect of the present invention a Fibre Channel switch element for processing frames is provided. The switch element includes a port for receiving a Fibre Channel frame; and a translation cache that compares a Fibre Channel frame header to plural fields in plural control words to determine if there is a match and generates an encapsulation signal, a de-encapsulation signal, a translation signal or a routing signal; and de-encapsulates the Fibre Channel frame header, if a de-encapsulation signal is active; translates the Fibre Channel frame header, if the translation signal is active; encapsulates the frame, if the encapsulation signal is active; and routes the frame using the translation cache if the routing signal is active.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 3 shows a translation table, according to one aspect of the present invention.

DETAILED DESCRIPTION

Definitions

Figure 1A:
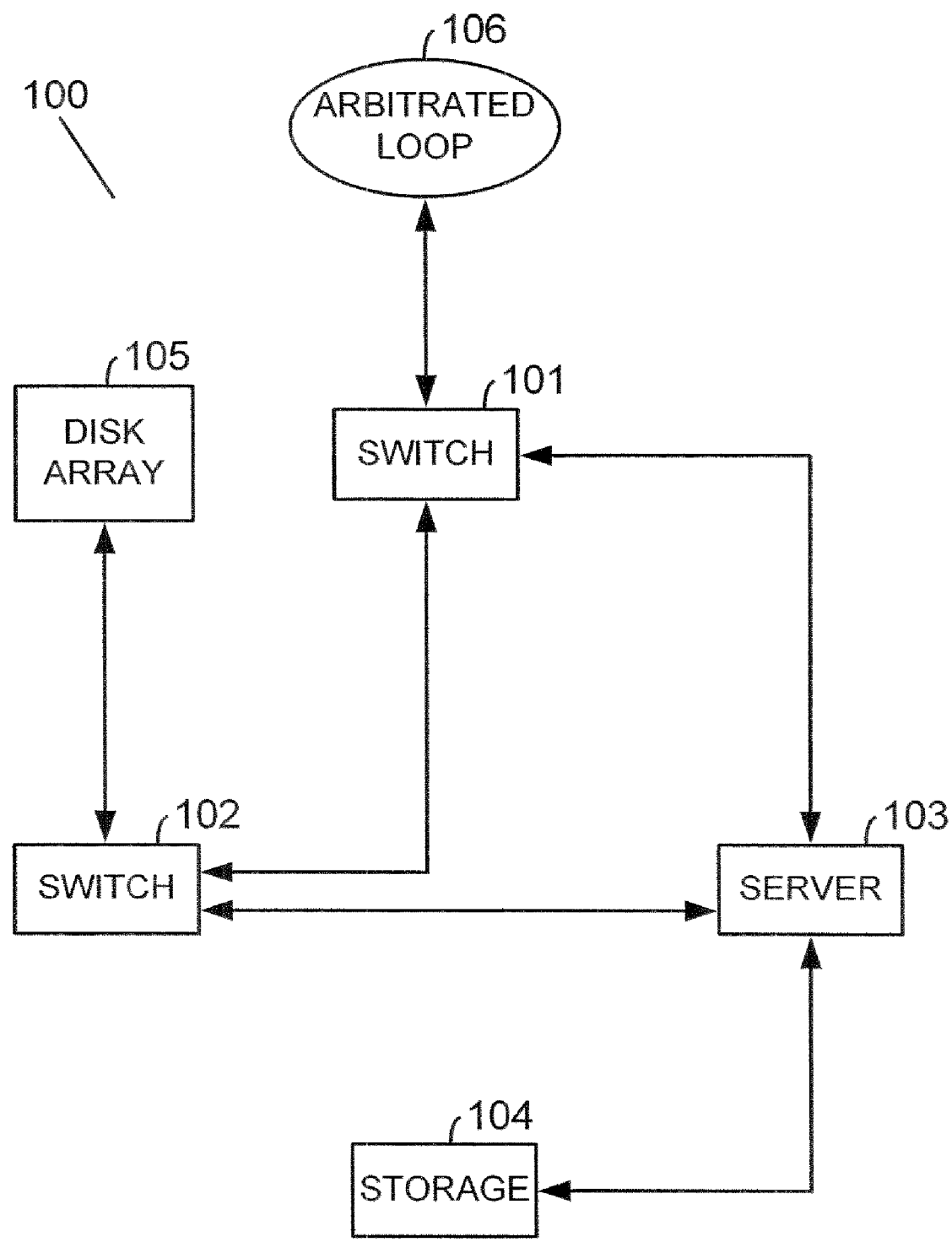
FIG. 1A shows an example of a Fibre Channel system.

The following definitions are provided as they are typically (but not exclusively) used in the Fibre Channel environment, implementing the various adaptive aspects of the present invention.

"DF_ID": A 12-bit destination Fabric identifier.

"D_ID": A 24-bit Fibre Channel header field that includes the destination address for a frame.

"E_Port": A Fabric expansion port that attaches to another inter-connect port to create an Inter-Switch Link.

"F_Port": A port to which non-loop N_Ports are attached to a Fabric and does not include FL_ports.

"Fibre Channel ANSI Standard" ("FC-FS-2") The standard (incorporated herein by reference in its entirety) describes the physical interface, transmission and signaling protocol of a high performance serial link for support of other high level protocols associated with IPI, SCSI, IP, ATM and others. This standard includes information regarding Virtual Fabric headers.

"Fabric": The structure or organization of a group of switches, target and host devices (NL_Port, N_Ports etc.).

"Fabric Identifier" (may also be referred to as "Fabric ID"): An identifier ("ID") that is used to identify a Fabric for a Fabric Router function.

"Fabric Router": A Fibre Channel device that allows Fibre Channel Devices, via N_Ports to be shared among multiple independent Fibre Channel Fabrics.

"Fabric Topology": A topology where a device is directly attached to a Fibre Channel Fabric that uses destination identifiers embedded in frame headers to route frames through a Fibre Channel Fabric to a desired destination.

"FR_Header": A header format (shown in FIG. 1G) defined by T11/04-520v0 for a Fabric Router for routing frames between different Fabrics.

"N_Port": A direct Fabric attached port, for example, a disk drive or a HBA.

"NL_Port": An L_Port that can perform the function of an N_Port.

"OX_ID": An Originator (i.e., a device/port that originates an exchange) Exchange identification field in a Fibre Channel frame header.

"Port": A general reference to N. Sub.-Port or F.Sub.-Port.

"RX_ID": A responder (i.e., a device/port that responds) exchange identification field in a Fibre Channel frame header.

"SAN": Storage Area Network

"S_ID": A 24-bit field in a Fibre Channel frame header that includes the source address for a frame.

"SF_ID": A 12-bit source Fabric identifier.

"Switch": A Fabric element conforming to the Fibre Channel Switch standards.

"VFT_Header": A Virtual Fabric tagging header as described in FC-FS-2 standard that allows a Fibre Channel frame to be tagged with a VF_ID. Frames with a VFT_Header may be transmitted over the same physical link.

"VF_ID" (or "VSANID"): A Virtual Fabric identifier that identifies a frame's Virtual Fabric.

"Virtual Fabric" ("VSAN"): These are Fabrics that are created by using virtual partitions in a physical Fibre Channel Fabric.

"VSAN": Virtual Storage Area Network

To facilitate an understanding of the preferred embodiment, the general architecture and operation of a Fibre Channel System and a Fibre Channel switch element will be described. The specific architecture and operation of the preferred embodiment will then be described with reference to the general architecture.

Fibre Channel supports three different topologies: point-to-point, arbitrated loop and Fibre Channel Fabric. The point-to-point topology attaches two devices directly. The arbitrated loop topology attaches devices in a loop. The Fibre Channel Fabric topology attaches host systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes it to another port.

Fibre Channel switches use memory buffers to hold frames received and sent across a network. Associated with these buffers are credits, which are the number of frames that a buffer can hold per Fabric port.

Fibre Channel proposed standard, T11/04-5200v0, incorporated herein by reference in its entirety describes multiple Fabrics and how they should be interconnected.

Fibre Channel proposed standard T11/04-395V2, incorporated herein by reference in its entirety, describes how Virtual Fabrics operate.

Network System:

FIG. 1A is a block diagram of a network system 100 implementing the methods and systems in accordance with the adaptive aspects of the present invention. Network system 100 may be based on Fibre Channel, IB or any other protocol. The examples below are described with respect to Fibre Channel but are applicable to IB and other network standards.

System 100 includes plural devices that are interconnected. Each device includes one or more ports, classified as for example, node ports (N_Ports), Fabric ports (F_Ports), and expansion ports (E_Ports) Node ports may be located in a node device, e.g. server 103, disk array 105 and storage device 104. Fabric ports are located in Fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102

Figure 1B:
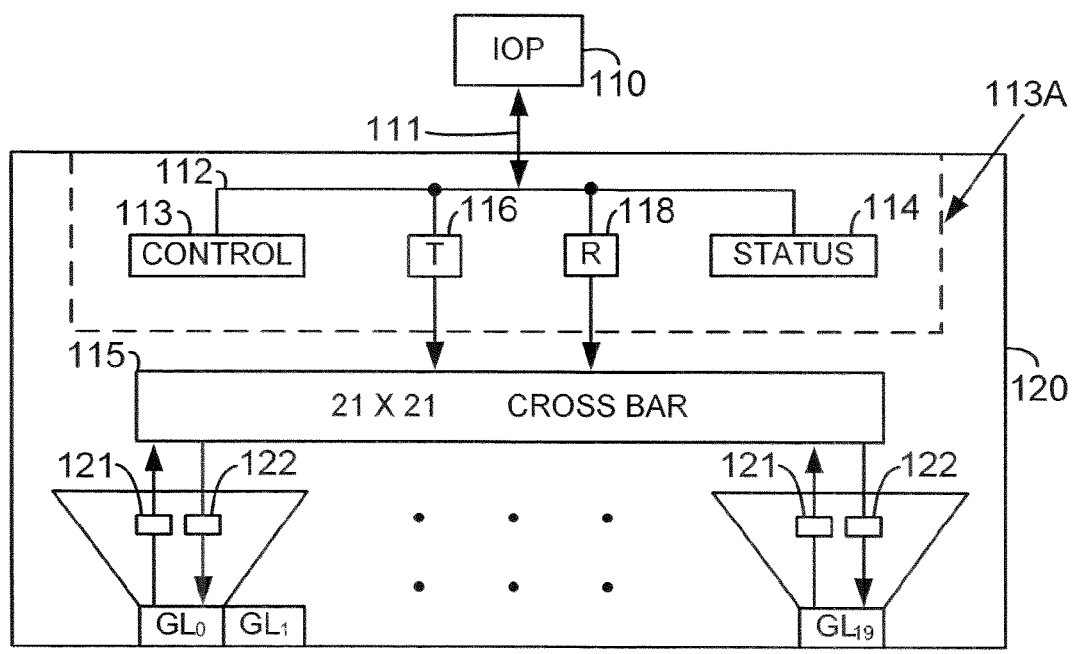
FIG. 1B shows an example of a Fibre Channel switch element, according to one aspect of the present invention.

Switch Element:

FIG. 1B is a block diagram of a 20-port ASIC Fabric element according to one aspect of the present invention. FIG. 1B provides the general architecture of a 20-channel switch chassis using the 20-port Fabric element. Fabric element includes ASIC 120 with non-blocking Fibre Channel class 2 (connectionless, acknowledged) service and class 3 (connectionless, unacknowledged) service between any ports. It is noteworthy that ASIC 120 may also be designed for class 1 (connection-oriented) service, within the scope and operation of the present invention as described herein.

The Fabric element of the present invention is presently implemented as a single CMOS ASIC, and for this reason the term "Fabric element" and ASIC are used interchangeably to refer to the preferred embodiments in this specification. Although FIG. 1B shows 20 ports, the present invention is not limited to any particular number of ports.

ASIC 120 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in Fabric element linking, as described below.

For illustration purposes only, all GL ports are drawn on the same side of ASIC 120 in FIG. 1B. However, the ports may be located on any or all sides of ASIC 120 as shown in other Figures. This does not imply any difference in port or ASIC design Actual physical layout of the ports will depend on the physical layout of the ASIC.

Each port GL0-GL19 includes transmit and receive connections to switch crossbar 115. Within each port, one connection is through receive buffer 121, which functions to receive and temporarily hold a frame during a routing operation. The other connection is through transmit buffer 122.

Switch crossbar 115 includes a number of switch crossbars for handling specific types of data and data flow control information. For illustration purposes only, switch crossbar 115 is shown as a single crossbar. Switch crossbar 115 is a connectionless crossbar (packet switch) of known conventional design, sized to connect 21×21 paths. This is to accommodate 20 GL ports plus a port for connection to a Fabric controller, which may be external to ASIC 120.

In the preferred embodiments of switch chassis described herein, the Fabric controller is a firmware-programmed microprocessor, also referred to as the input/output processor ("IOP"). As seen in FIG. 1B, bi-directional connection to IOP 110 is routed through port 111, which connects internally to a control bus 112. Transmit buffer 116, receive buffer 118, control register 113 and Status register 114 (within block 113A) connect to bus 112. Transmit buffer 116 and receive buffer 118 connect the internal connectionless switch crossbar 115 to IOP 110 so that it can source or sink frames.

Control register 113 receives and holds control information from IOP 110, so that IOP 110 can change characteristics or operating configuration of ASIC 120 by placing certain control words in register 113. IOP 110 can read status of ASIC 120 by monitoring various codes that are placed in status register 114 by monitoring circuits (not shown).

Figure 1C:
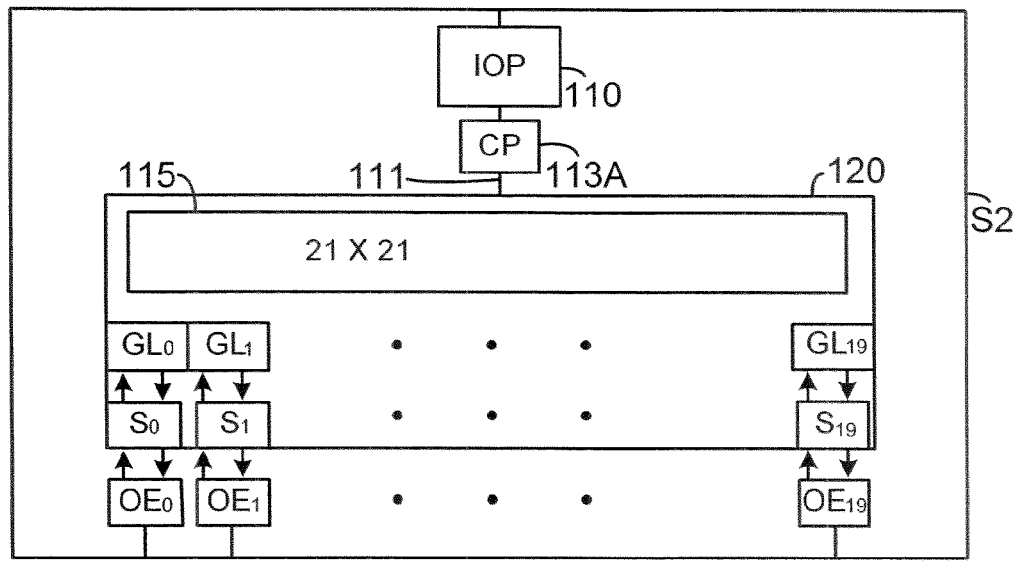
FIG. 1C shows a block diagram of a 20-channel switch chassis, according to one aspect of the present invention.

FIG. 1C shows a 20-channel switch chassis S2 using ASIC 120 and LOP 110. IOP 110 in FIG. 1C is shown as a part of a switch chassis utilizing one or more of ASIC 20. S2 also includes other elements, for example, a power supply (not shown) The 20 GL_Ports correspond to channels C0-C19.

Each GL_Port has a serial/deserializer (SERDES) designated as S0-S19. Ideally, the SERDES functions are implemented on ASIC 120 for efficiency, but may alternatively be external to each GL_Port. The SERDES converts parallel data into a serial data stream for transmission and converts received serial data into parallel data.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
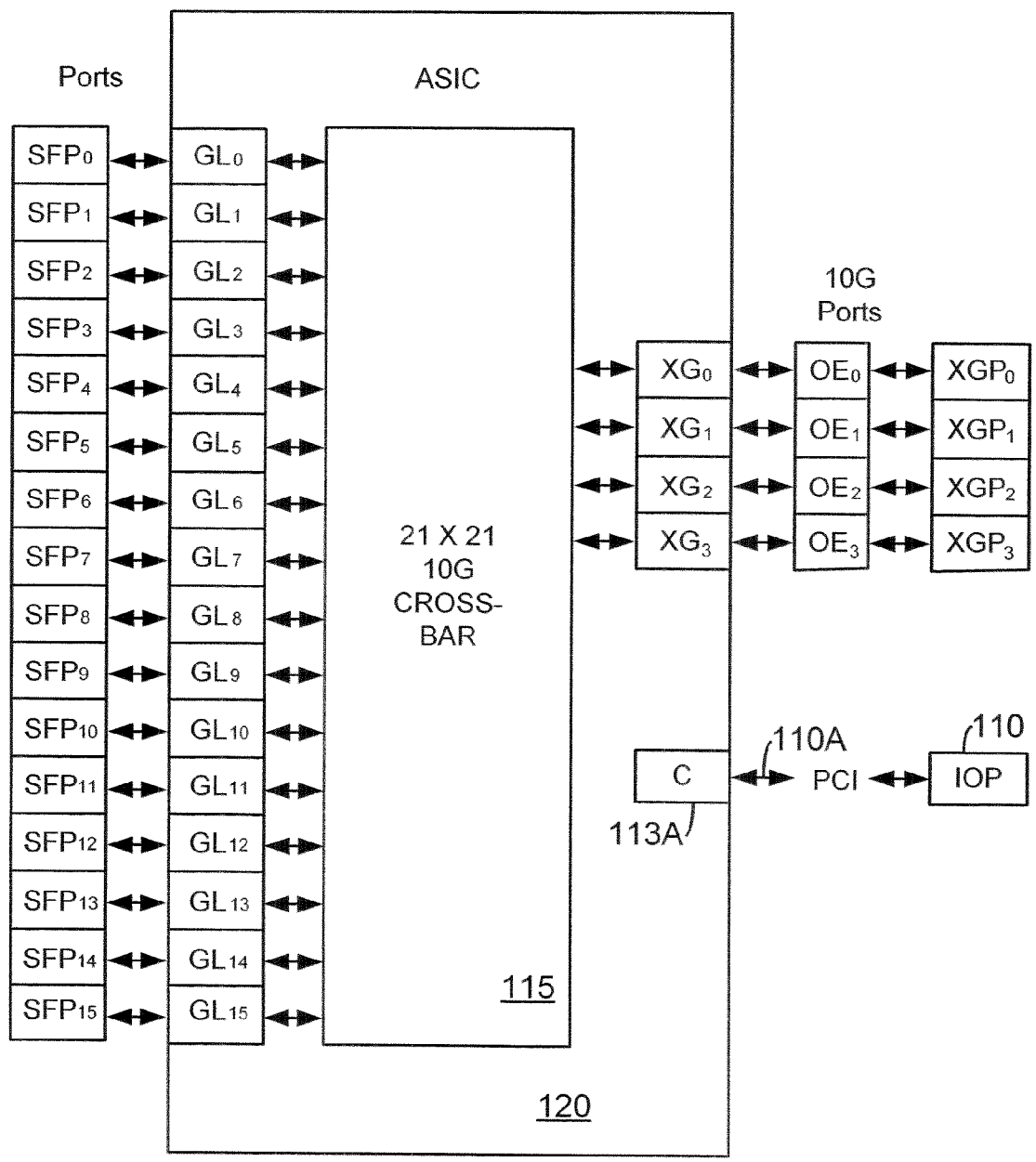
FIG. 1D shows a block diagram of a Fibre Channel switch element with sixteen GL_Forts and four 10 G ports, according to one aspect of the present invention.

FIG. 1D shows a block diagram of ASIC 120 with sixteen GL ports and four 10 G (Gigabyte) port control modules designated as XG0-XG3 for four 10 G ports designated as XGP0-XGP3. ASIC 120 includes a control port 113A that is coupled to IOP 110 through a PCI connection 110A.

Figures 1, 1E, 2:
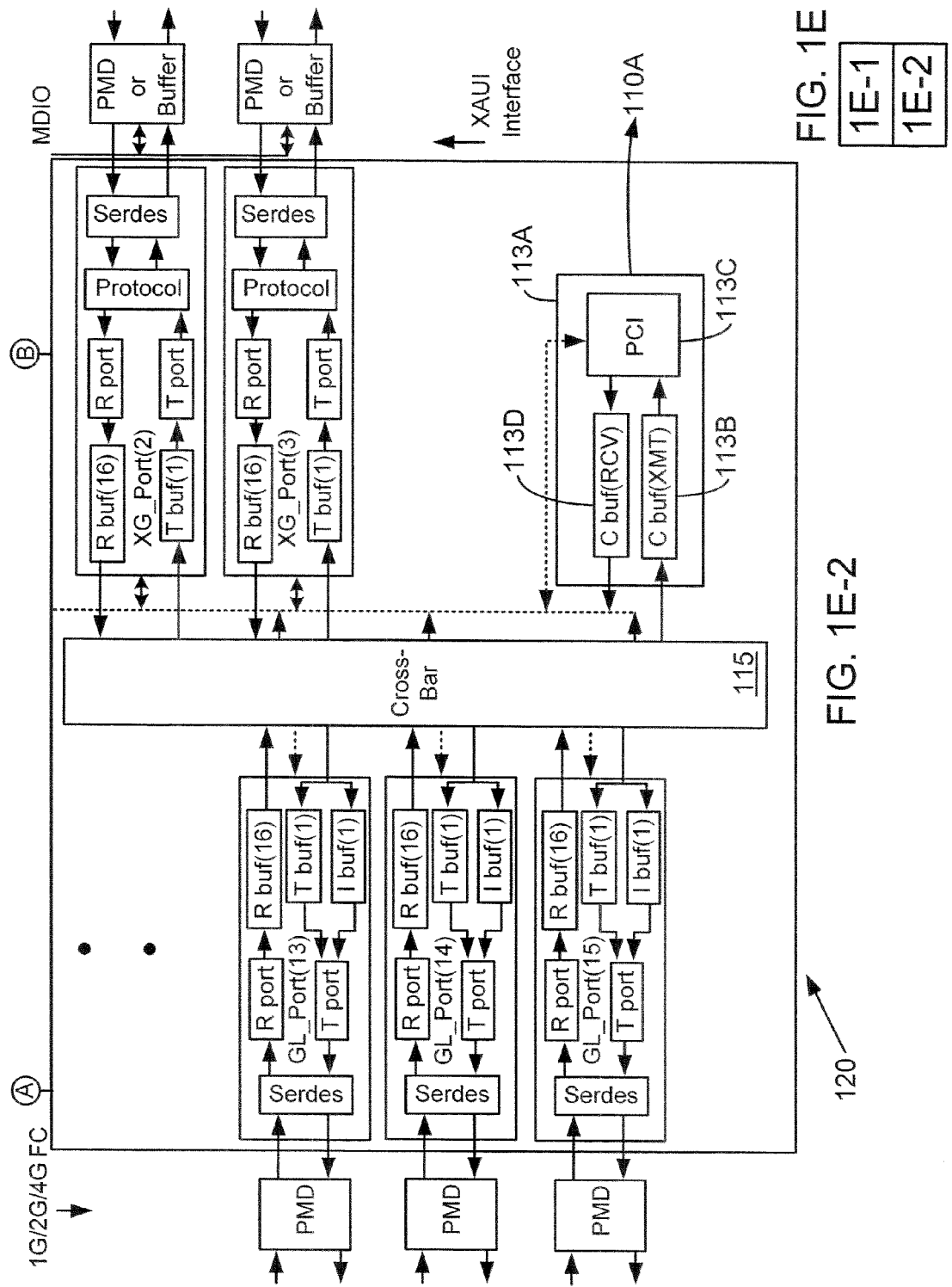
FIG. 1E shows a block diagram of a switch port using an address mapping cache, according to one aspect of the present invention.

FIGS. 1E(i)/1E(ii) (jointly referred to as FIG. 1E) show yet another block diagram of ASIC 120 with sixteen GL and four XG port control modules. Each GL port control module has a Receive port (RPORT) 132 with a receive buffer (RBUF) 132A (similar to 121, FIG. 1B) and a transmit port 130 with a transmit buffer (TBUF) 130A (similar to 122, FIG. 1B). GL and XG port control modules are coupled to physical media devices ("PMD") 134 and 135 respectively.

Control port module 113A includes control buffers 113B and 113D for transmit and receive sides, respectively. Module 113A also includes a PCI interface module 113C that allows interface with IOP 110 via a PCI bus 110A. It is noteworthy that the present invention is not limited to the PCI bus standard, any other protocol/standard may be used to interface control port 113A components with IOP 110.

XC_Port (for example 136) includes RPORT 138A with RBUF 138 similar to RPORT 132 and RBUF 132A and a TBUF 137 and TPORT 137A similar to TBUF 130A and TPORT 130. Protocol module 139 interfaces with SERDES to handle protocol based functionality.

Incoming frames are received by RPORT 132 via SERDES 131 and then transmitted using TPORT 130. Buffers 132A and 130A are used to stage frames in the receive and transmit paths.

Figure 1F:
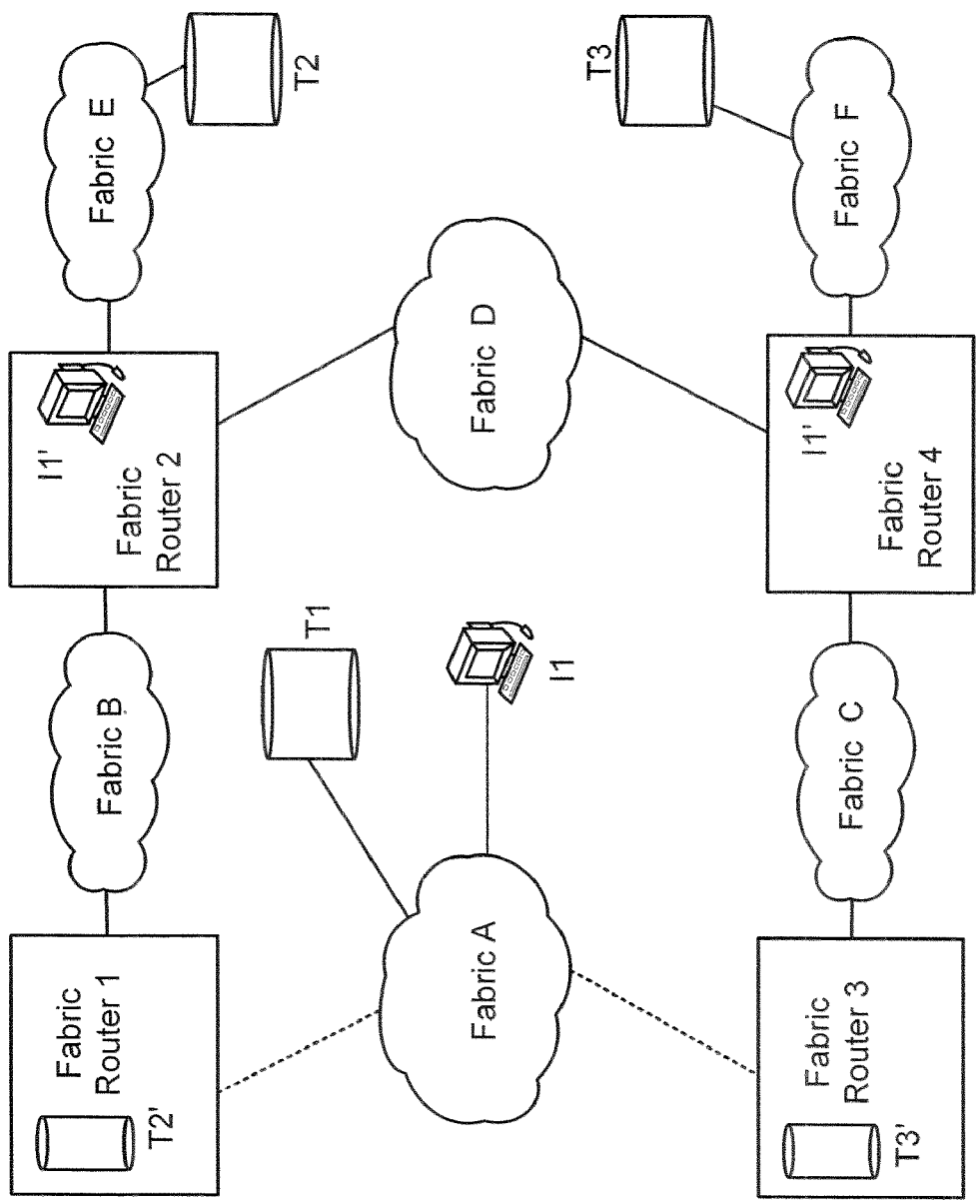
FIG. 1F shows a block diagram of a system with multiple Fabrics that can use the address translation scheme, according to one aspect of the present invention.

Inter-Fabric Routing:

FIG. 1F shows a block diagram of a system with multiple Fabrics where Inter-Fabric routing is applicable. Fabrics A, B, C, D, E and F are individual Fabrics. Fabric A is coupled to Fabric Router 1 and Fabric Router 3 and host I1 (Initiator 1) and device T1 (target 1).

Fabric D is coupled to Fabric Router 2 and Fabric Router 4; while Fabric C is coupled to Fabric Router 3 and Fabric Router 4. Fabric F is coupled to Fabric Router 4 and target T3; while Fabric E is coupled to Fabric Router 2 and target 2 (T2).

Targets T2' and T3' are virtualized targets and initiator (host) I1' is a virtualized host. Host I1 uses Fabric Routers 1 and 2 to communicate with device T2 and Fabric Routers 3 and 4 to communicate with device T3. A Fabric Router is a Fibre Channel device that facilitates the remapping/translation or virtualization of a device address allowing select devices to be shared among multiple independent Fibre Channel Fabrics.

Figure 1G:
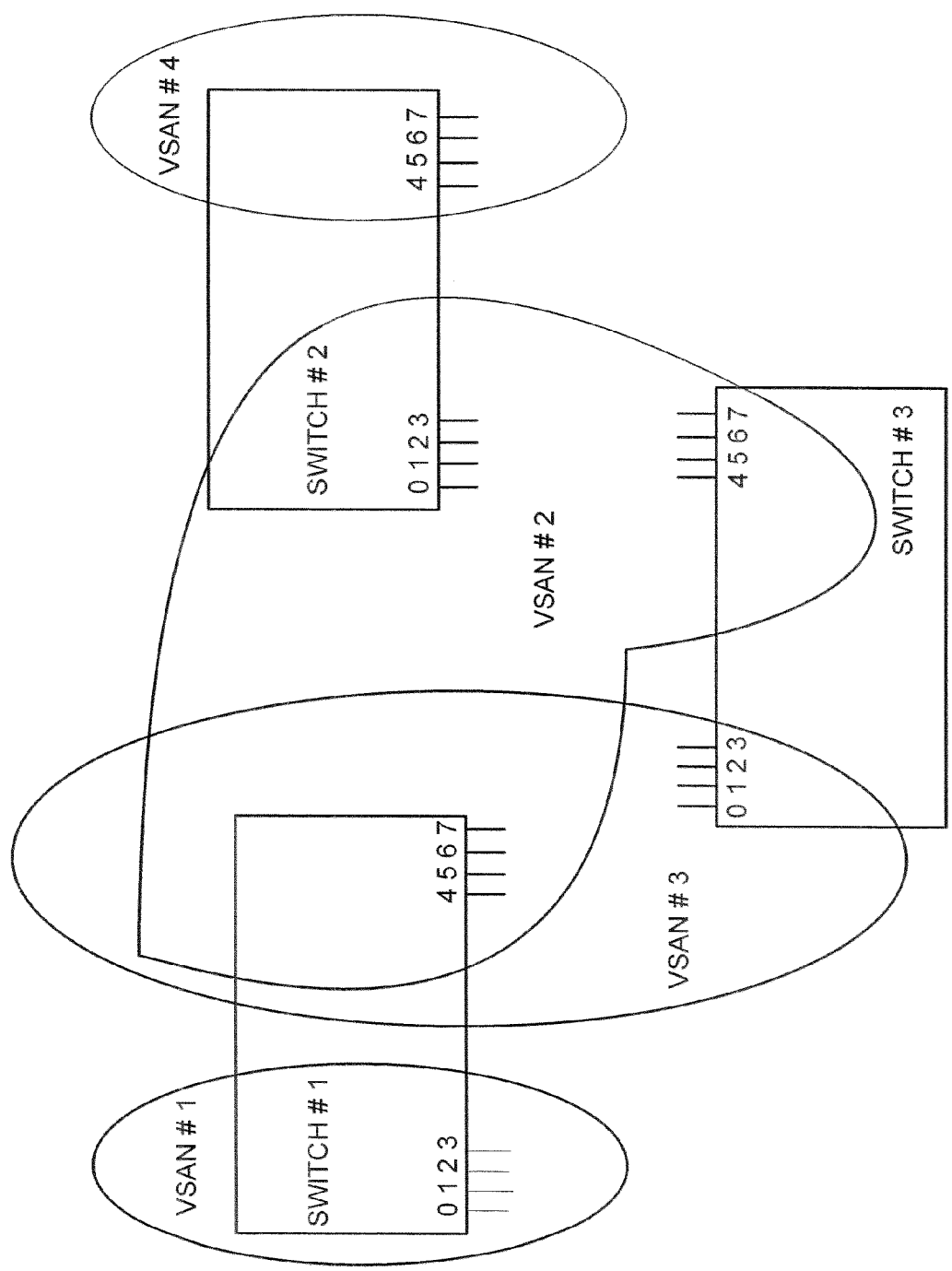
FIG. 1G shows a block diagram of a system with VSAN's that can use the address translation scheme, according to one aspect of the present invention.

Virtual Fabrics:

FIG. 1G shows a top-level block diagram for Virtual Fabrics (VSANs), which use the extended headers, according to one aspect of the present invention. FIG. 1G shows three Fabric switches, 1, 2 and 3. Each switch has 8-ports labeled 0-7. It is noteworthy that the present invention is not limited to any particular number/type of ports.

VSAN #1 is the first Virtual Fabric that includes ports 0-3 for Switch #1. VSAN #2 includes Switch #1, ports 4-7; Switch #2, ports 0-3; and Switch #3, ports 4-7. VSAN #3 includes Switch #1, ports 4-7 and Switch #3, ports 0-3. VSAN #4 includes Switch #2, ports 4-7.

The extended headers are used to route frames between the plural Fabrics, for example, between Fabric 1 and Fabric 4. It is noteworthy that the present invention is not limited to any particular number of Fabrics or switches.

Figure 2A:
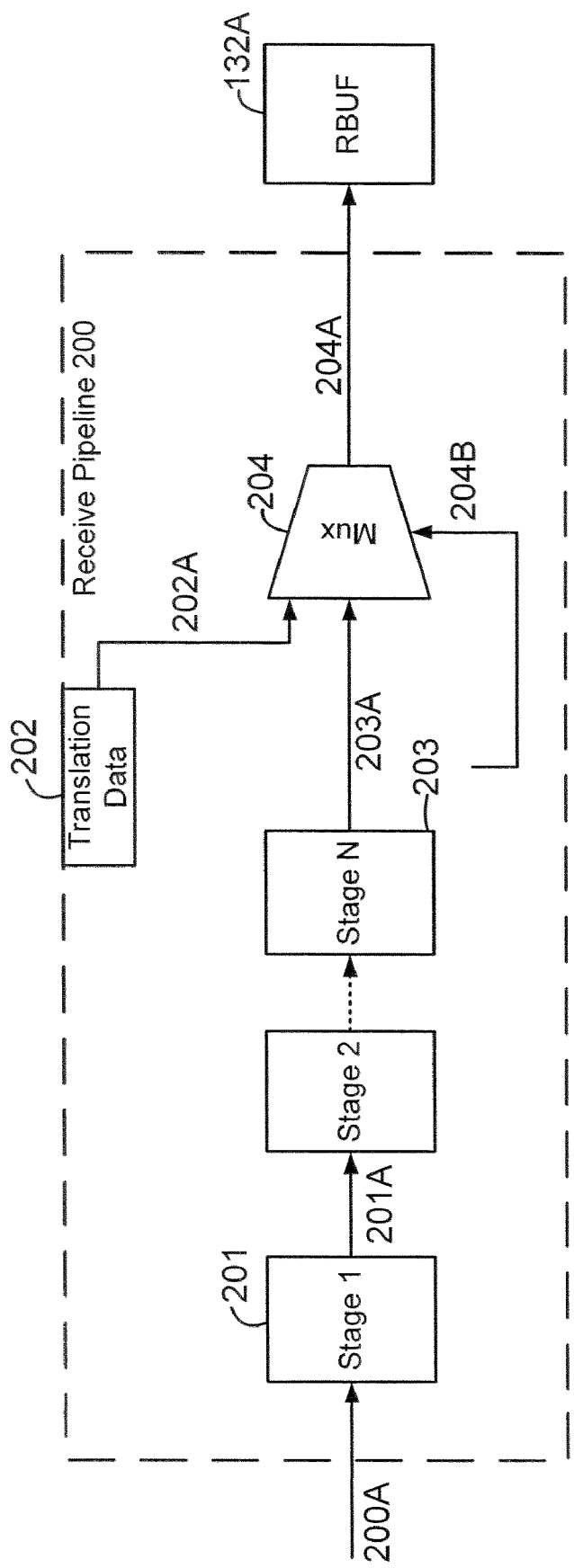
FIG. 2A shows a receive pipeline used to process receive frames, according to one aspect of the present invention.

Frame Header Translation:

FIG. 2A shows a receive pipeline in a RPORT 132 used to process receive frames, according to one aspect of the present invention. Receive pipeline 200 is enabled when a frame is received.

Receive pipeline 200 includes plural stages, shown as Stage 1, Stage 2 . . . Stage N (203). Stage 1 201 receives data 200A and output data 201A from stage 1 201 passes through several stages and output 203A from Stage N is input to Multiplexer (Mux) 204. It is noteworthy that the present invention is not limited to any particular number of stages.

Mux 204 also receives translation data 202A from translation data block 202, which is used to translate addresses in a received frame header, as described below with respect to FIG. 2D. Output 204A from Mux 204 is then written in receive buffer 132A. Control signal 204B is used to activate Mux 204.

In a conventional switch, frame header translation may be performed by a microprocessor According to one aspect of the present invention, a multiple stage pipeline enables frame translation to be performed in specialized hardware without involving a microprocessor.

Figure 2B:
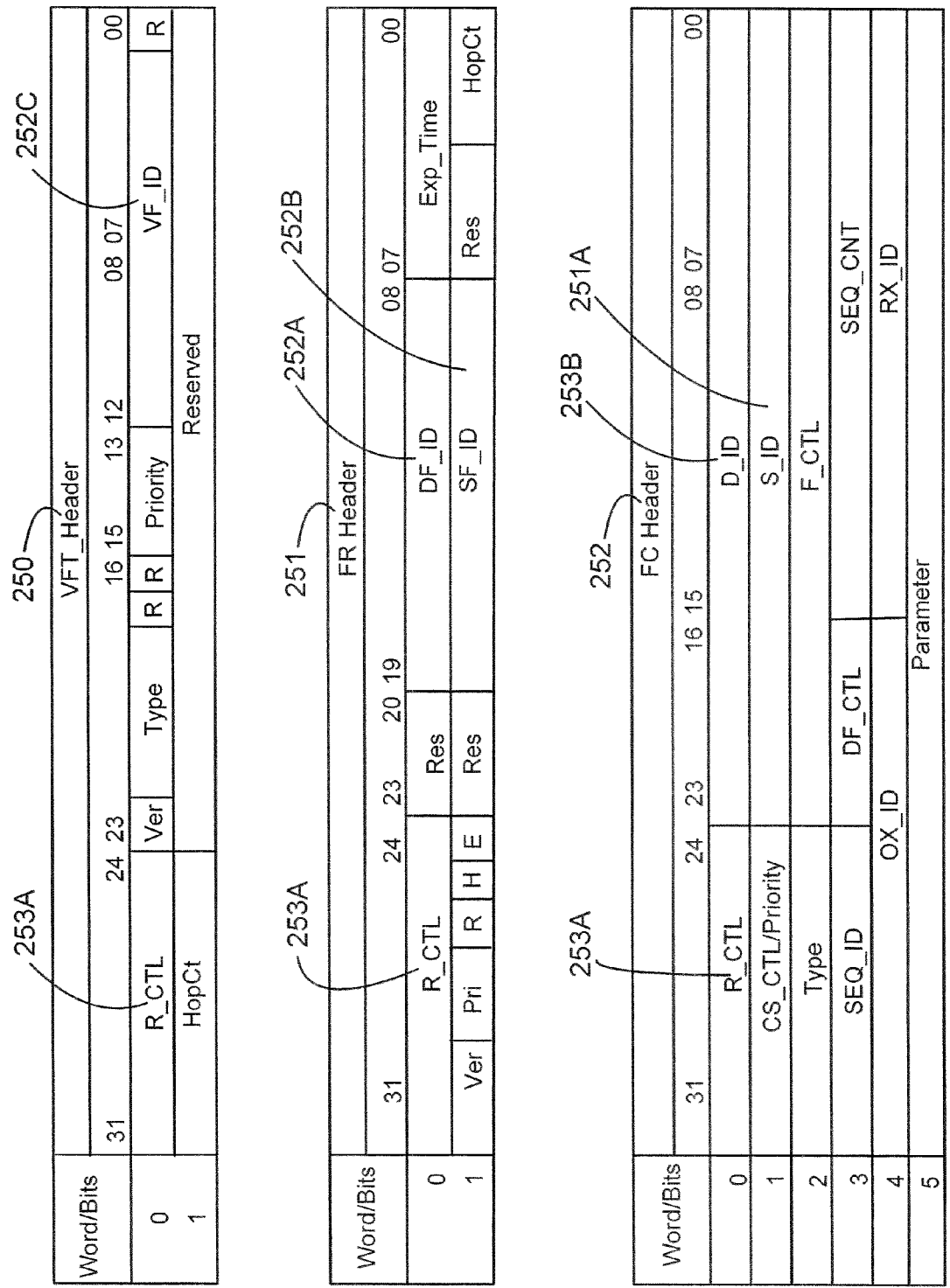
FIG. 2B shows Inter Fabric Header, Virtual Fabric Header and standard Fibre Channel Header, according to one aspect of the present invention.

Fibre Channel Headers:

FIG. 2B shows Inter Fabric Header, Virtual Fabric Header and standard Fibre Channel Header, according to one aspect of the present invention.

VSAN VFT Header 250 is used for routing frames between VSAN's. Header 250 includes 12 bit wide virtual Fabric identifier ("VF_ID") 252C (VF_ID or VSAN_ID are used interchangeably throughout this specification) VF_ID 252C is used for routing frames to a virtual Fabric, which has an ID equal to VF_ID 252C. According to one aspect of the present invention, VF_ID 252C of a received frame is compared with VF_ID 242C in control word1 242 as described below with respect to FIG. 2D. VFT_Header 250 also includes a routing control field 253A (R_CTL) that is used for frame header category identification. FR Header 251 is used for routing frames between Fabrics. Header 251 includes 12 bit wide source Fabric ID 252B (SF_ID) and a destination Fabric ID 252A (DF_ID). DF_ID 252A is used for routing frames to a Fabric, which has an ID equal to DF_ID 252A. According to one aspect of the present invention, DF_ID 252A and SF_ID 252B of a received frame are compared with DF_ID 242A and SF_ID 242B respectively as described below with respect to FIG. 2D. Header 251 also includes a routing control field 253A (R_CTL) that is used for frame header category identification.

FC Header 252 is used for routing frames between Fibre Channel devices Header 252 includes a 24 bit wide source ID 251A (S_ID) and a destination ID 253B (D_ID). D_ID 253B is used for routing frames to a Fibre Channel device, which has an ID equal to D_ID 253B. According to one aspect of the present invention, D_ID 253B and SF_ID 251A of a received frame are compared with D_ID 243B and S_TD 241A respectively as described below in FIG. 2D. Header 252 also includes a routing control field 253A (R_CTL) that is used for frame header and frame category identification.

Figure 2C:
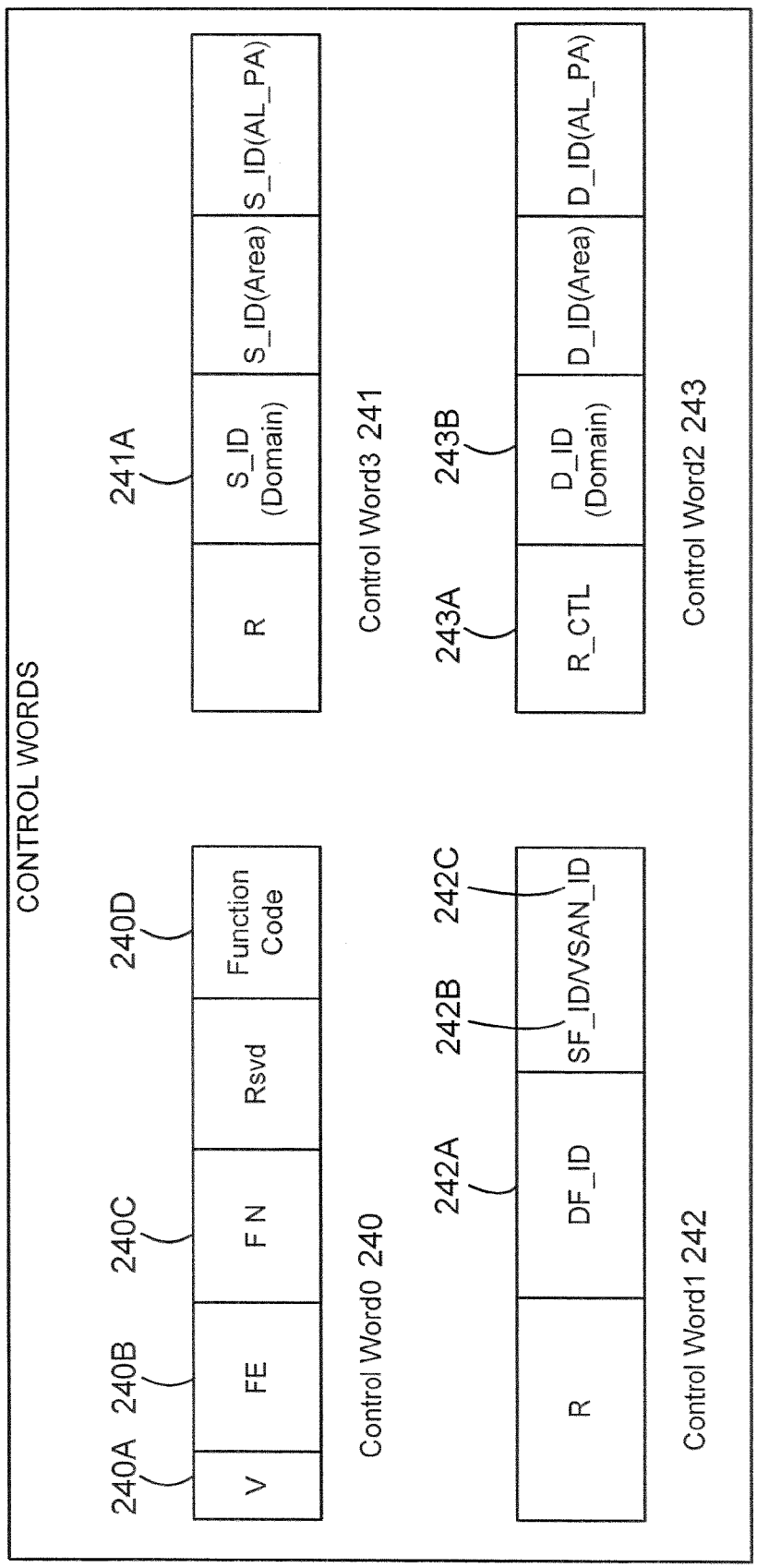
FIG. 2C shows control words used to translate data and manipulate headers, according to one aspect of the present invention.

FIG. 2C shows control words that are used to translate data and manipulate headers, according to one aspect of the present invention. Control words may be stored in registers that are accessible by IOP 110. Control words are used to compare certain fields in received frames for special routing, as described below with respect to FIG. 2D.

Turning in detail to FIG. 2C, control Word0 240 may be a 32-bit wide word that includes the following fields.

Valid bit ("V") 240A: This bit indicates if a cache entry is valid.

Field Enable ('FE') 240B, Field Negate ("FN") 240C: These fields may be 12 bits wide and include control information to compare fields in a received frame header. Each bit in Field Enable signal 240B has a corresponding bit in Field Negate signal 240C. If a bit in Field Enable signal 240B is set, then the particular field corresponding to the bit is compared. The compared result is inverted if the bit corresponding to the field is set in Field Negate signal 240C. For example, if bit 30 is set in Field Enable 240B, then received frame's DF_ID 252A is compared against Rx DF_ID 242A in control word1 242. The output is inverted if a bit 30 is set/asserted in Field Negate 240C signal.

Function Code 240D is used by Translation Cache State Machine 220 to determine what action to perform on a frame that generated a hit. Function Code 240D is also used by control module 222 (as shown in FIG. 2D) for generating control signals to blocks 221, 223, 223A and 223B.

The following provides an example of plural bit values in control word0 240.

Bit 30: compare Receive ("Rx") DF_ID
Bit 29: compare Rx SF_ID or VSAN_ID
Bit 28: compare Rx and Tx Upper 4 bits of R_CTL
Bit 27: compare Rx and Tx Lower 4 bits of R_CTL
Bit 26: compare Rx D_ID Domain
Bit 25: compare Rx D_ID Area
Bit 24: compare Rx D_ID AL_PA
Bit 23: compare Rx S_ID Domain
Bit 22: compare Rx S_ID Area
Bit 21: compare Rx S_ID AL_PA
Bit 20: compare Transmit ("Tx") DF_ID
Bit 19: compare Tx SF_ID or VSAN_ID
Bit 18: negate compare for Receive ("Rx") DF_ID
Bit 17: negate compare for Rx SF_ID or VSAN_ID
Bit 16: negate compare for Rx and Tx Upper 4 bits of R_CTL Bit 15: negate compare for Rx and Tx Lower 4 bits of R_CTL
Bit 14: negate compare for Rx D_ID Domain
Bit 13: negate compare for Rx D_ID Area
Bit 12: negate compare for Rx D_ID AL_PA
Bit 11: negate compare for Rx S_ID Domain
Bit 10: negate compare for Rx S_ID Area
Bit 09: negate compare for Rx S_ID AL_PA
Bit 08: negate compare for Transmit ("Tx") DF_ID
Bit 07: negate compare for Tx SF_ID or VSAN_ID It is noteworthy that although various bit values are shown in FIG. 2B, the adaptive aspects of the present invention are not limited to any particular bit value.

Control Word1 242 is used to compare received IFR_Header data 251 or VFT_Header data 250 in a Fibre Channel frame. Control Word1 242 may be 32-bit wide word and may include the following fields.

Destination Fabric ID ("DF_ID") 242A: This field may include information, which is compared with DF_ID field 252A in a received or to be transmitted frame header as described below with respect to FIG. 2D. Setting a bit in Field Enable field 240B enables the comparison. In one aspect of the present invention, DF_ID 242A may be 12 bits wide.

Source Fabric ID ("SF_ID") 242B: This field may include information, which is compared with SF_ID field 252B in a received or to be transmitted frame header as described below with respect to FIG. 2D. Setting a bit in FE 240B enables the comparison. In one aspect of the present invention, SF_ID 242B may be 12 bits wide.

Virtual SAN ID ("VSAN_ID") 242C: This field includes information, which is compared with VF_ID field 252C in a received or to be transmitted frame header as described below with respect to FIG. 2D. Setting a bit in FE 240B enables the comparison. In one aspect of the present invention, VSAN_ID 242C may be 12 bits wide.

Control Word2 243 is used to compare received Fibre Channel header 252 data for standard Fibre Channel frames and the standard Fibre Channel frame header that follows IFR_Header data 251 and VFT_Header data 250. Control Word2 243 may be a 32-bit wide word that includes the following fields.

Routing control 243A ("R_CTL"): This field includes information, which is compared with R_CTL field 253A in a received or to be transmitted frame header as described below with respect to FIG. 2D. Setting a bit in FE 240B enables the comparison. In one aspect of the present invention, R_CTL 243A may be 8 bits wide.

Destination ID 243B: This field includes information, which is compared with D_ID field 253B in a received frame header as described below with respect to FIG. 2D. Setting a bit in FE 240B enables the comparison. In one aspect of the present invention, D_ID 243B may be 24 bits wide.

Control Word3 241 has fields that are compared to received Fibre Channel header 252 in a Fibre Channel frame. Control Word3 241 may be a 32-bit wide word that includes the following fields.

Source ID 241A ("S_ID"): This field includes information, which is compared with S_ID field 251A in a received frame header as described below with respect to FIG. 2D Setting a bit in FE 240B enables the comparison. In one aspect of the present invention, S_ID 241A may be 24 bits wide.

Figures 1, 2D:
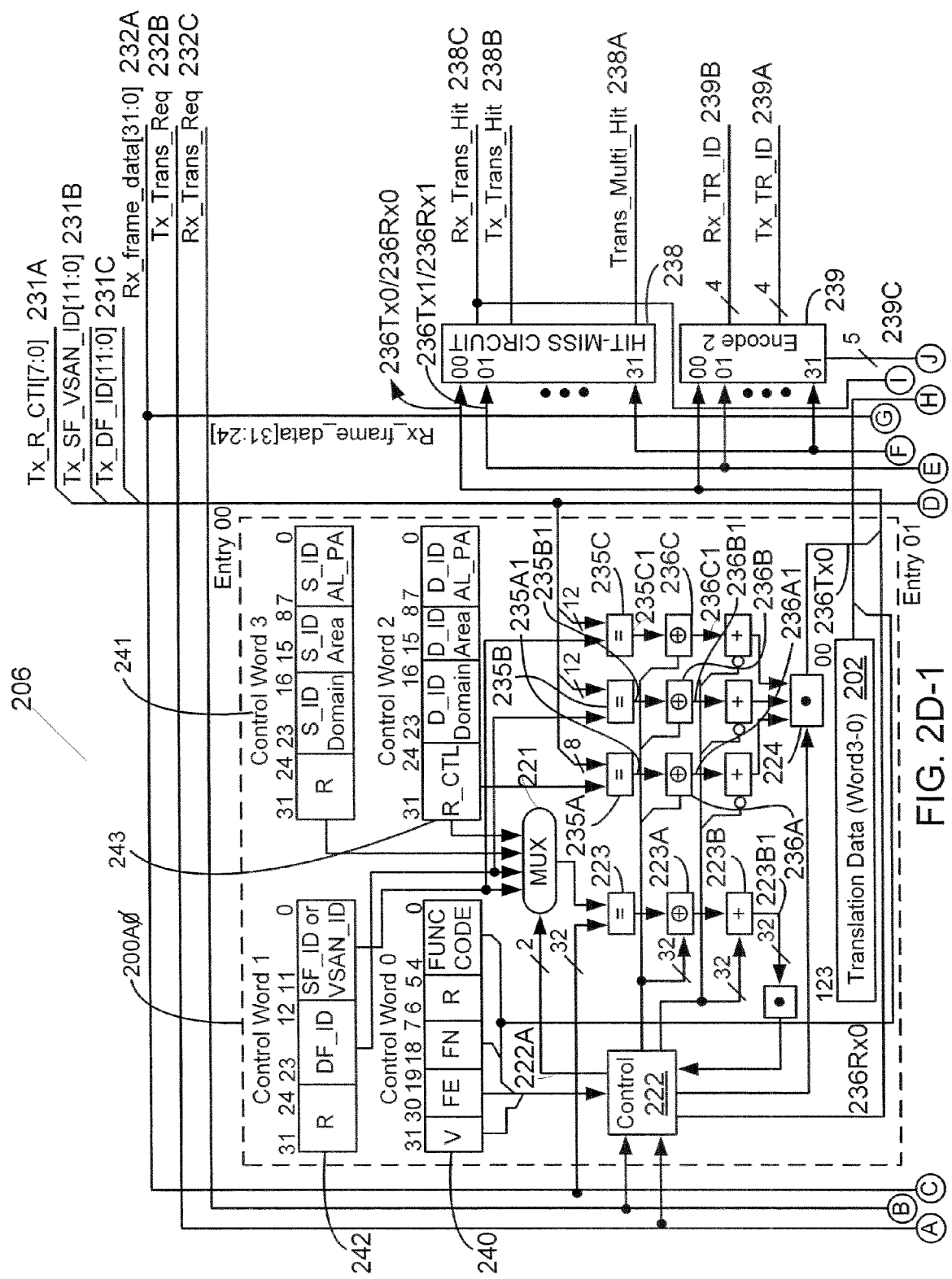
FIG. 2D shows a schematic of a translation cache used for address translation and header manipulation, according to one aspect of the present invention.

Frame Header Translation Cache 206:

FIG. 2D shows a schematic of a translation cache 206 (may also be referred to as Cache 206) that is used for address translation and header manipulation for routing Fibre Channel frames, according to one aspect of the present invention. Cache 206 is used to compare received frame header data with plural control word fields (described above with respect to FIG. 2C) to determine the action that needs to be taken. Based on the comparison results, the receive frame header is translated/encapsulated/de-encapsulated/passed unchanged and a routing option is selected.

Cache 206 includes plural entries that are shown as entry00 (referred to as 200A0 in FIG. 2D) to entry31 (referred to as 200A31 in FIG. 2D). Each Cache 206 entry uses a unique set of control word 240, 241, 242 and 243 fields for simultaneously comparing against the receive frame header fields. Although FIG. 2D shows 32 entries (0 to 31), the present invention is not limited to any particular number of entries.

Cache 206 includes control block 222. Transmit request signal/command ("Tx Trans_Req") 232B (may also be referred to as "signal 232B") and receive request signal/command ("Rx_Trans_Req") 232C (may also be referred to as "signal 232C") are inputs to control block 222. Signal 232C may indicate arrival of a frame. Signal 232B may indicate that a frame needs to be transmitted. The term signal and command are used interchangeably throughout this specification.

Signal 232C enables frame header comparison in the receive path. Signal 232B enables frame header comparison in the transmit path.

Control block 222 also receives input data from control word 240 fields. Valid bit 240A is set for a valid cache entry and FE 240B and FN 240C have been described above.

Control block 222 generates a select signal 222A based on inputs from Control Word 240, if valid bit 240A is enabled. Control word 240 fields in conjunction with a frame word count determine what fields in control word 241, 242 and 243 are sequenced through for comparison. The frame word count is a running count of the number of frame words that have been received at a given time.

Multiplexer ("Mux") 221 receives signal 222A and based on that, Mux 221 selects fields from Control Words 241, 242 and 243 for comparison, as shown in FIG. 2D.

Comparator 223 compares output of Mux 221 (i.e. selected fields from Control Word 240-243) with fields that are included in incoming frame data 232A. Output from comparator 223 passes through logic blocks 223A and 223B. Logic block 223B generates a command/signal 223B1 that is transmitted to control block 222 which generates receive hit signal 236R0 after the control word fields have been compared.

Comparator 235A compares transmit Tx_R_CTL 231A with R_CTL 243A and generates command/signal 235A1. Comparator 235B compares transmit SF_ID/VSAN_ID 231B with SF_ID/VSAN_ID 242C and generates signal 235B1. Similarly, comparator 235C compares transmit DF_ID 231C with DF_ID 242A and generates signal 235C1.

Output signals 235A1, 235B1 and 235C1 pass through logic blocks 236A, 236B and 236C and generate signals 236A1, 236B1 and 236C1, respectively, which are input to logic block 224. Logic block 224 generates a hit signal 236T0 based on input signals 236A, 236B, 236C, 222A and activation from Control 222.

"Hit-miss" module 238 (may also be referred to as "module 238" or "circuit 238") receives signals 236R0 and 236T0 from entry 200A0. Circuit 238 also receives similar receive/transmit signals (shown as 236T0/236R0 and 236T31 and 236R31) from other entries (200A0-200A31). Based on the inputs, circuit 238 generates an output receive hit signal 238C (shown as "Rx Trans_Hit") or transmit hit signal 238B (shown as "Tx_Trans_Hit") or a multi hit signal 238A (shown as "Trans_Multi_Hit").

Transmit hit signal 238B indicates a match in the transmit path and receive hit signal 238C indicates a match for the receive path. If multiple hit signal 238A is generated, then the lowest entry number, with a hit, will be used and an error or warning status is set and sent to IOP 110.

An encoder module 239 also receives hit signals (236T0-236T31, 236R0-236R31) from all the entries. Encoder 239 generates output signals 239A, 239B and 239'. Signal 239A is used for hardware-enforced zoning. Signal 239B is used for column selection in frame routing. These values are similar to output 239C except that they have limited range corresponding to the number of columns and hardware enforced zone groups supported by the overall design.

Output 239C of encoder 239 is also sent to a state machine 220. State machine 220 receives some fields of the incoming frame data words 232A, control word field 240D for each entry, RX_Trans_Hit 238C and translation data 202 for each entry (200A0-200A31) in cache 206. Translation data 202 includes data that is used to substitute received frame header information. The contents of translation data 202 are further described below with respect to FIG. 3.

Based on the input signals, state machine 220 may generate the following output signals that are used for translation/encapsulation/de-encapsulation as well as routing of a received frame.

Trans_Done 220A: This signal indicates that a translation comparison process has been completed on a frame header.

Unencap_Valid 220B: This signal indicates that receive side de-encapsulation needs to be performed on a frame header.

Unencap_Code 220C: This signal is used when Unencap_Valid 220B signal is asserted, to indicate the number of bytes or data word ("dwords") that need to be removed from a frame header. For example if the Unencap_Code is set to a binary value of 01, it may indicate that 1 data word ("dword") of a frame header needs to be removed.

TR_Route_Valid 220D: This signal is used to indicate that routing of a received frame is to be performed by Translation Cache 206 instead of a conventional steering mechanism. The matching entries sub-function in translation data 202 defines the routing action to be taken. The sub-function is an encoded version of Route_Code 220F.

Rx_Domain_Valid 220E: This signal is used to indicate if Translation Cache 206 is providing the Native Domain_ID for routing instead of a conventional Native Domain_ID stored in other port control registers. When Rx_Domain_Valid 220E is asserted, the Native Domain_ID generated by Translation Cache 206 is provided on Route_Data 220F1.

Route_Code 220F: This signal is used when TR_Route_Valid signal 220D is asserted. This signal indicates the type of routing that needs to be performed on the frame. For example, if the binary Route_Code value is 01, then it may indicate routing by column A method. Similarly, if the binary Route_Code value is 10, then it may indicate routing by OX_ID hashing method and if the binary Route_Code value is 11, then it may indicate routing to IOP 110. The above methods of routing are described in detail in a co-pending US patent application, entitled "Method and System for Data Dependent Network Routing"; Ser. No. 10/894,627, filed on Jul. 20, 2004, incorporated herein by reference in its entirety.

Route_Data 220F1: This may be a 32-bit routing field used in conjunction with Route_Code 220F to route data using the method indicated by the Route_Code 220F. Route_Data 220F1 also indicates the Native Domain_ID when the Rx_Domain_Vaild 220E signal is asserted.

Trans_Mask 220G, Trans_Data 220H: These may be 32-bit wide signals indicating that a translation function needs to be performed. If a bit in Trans_Mask 220G is active, then a corresponding bit in the Trans_Data field 220H is substituted in a receive frame header. For example, if bits 28 and 13 are set in the Trans_Mask signal 220G, then the corresponding bits 28 and 13 are substituted in the receive frame header. No substitution may be performed on the remaining dword bits. A different Trans_Mask 220G and Trans_Data 220H are sent for each frame header word to be processed. The timing of these signals is such as to be aligned with the incoming frame in the Receive Pipeline 200 discussed in FIG. 2A.

Encap_H1_Valid 220I, H1_Data 220J: H1_Data 220J is a 64-bit signal that is used to encapsulate a received frame header with a VSAN or IFR header. H1_Data 220J is used when Encap_H1_Valid signal 220I is active.

Encap_H2_Valid 220K, H2_Data 220L: may be a 64-bit signal that is used to encapsulate a received frame header. H2_Data 220L is used when Encap_H2 Valid signal 220K is active.

Figure 2E:
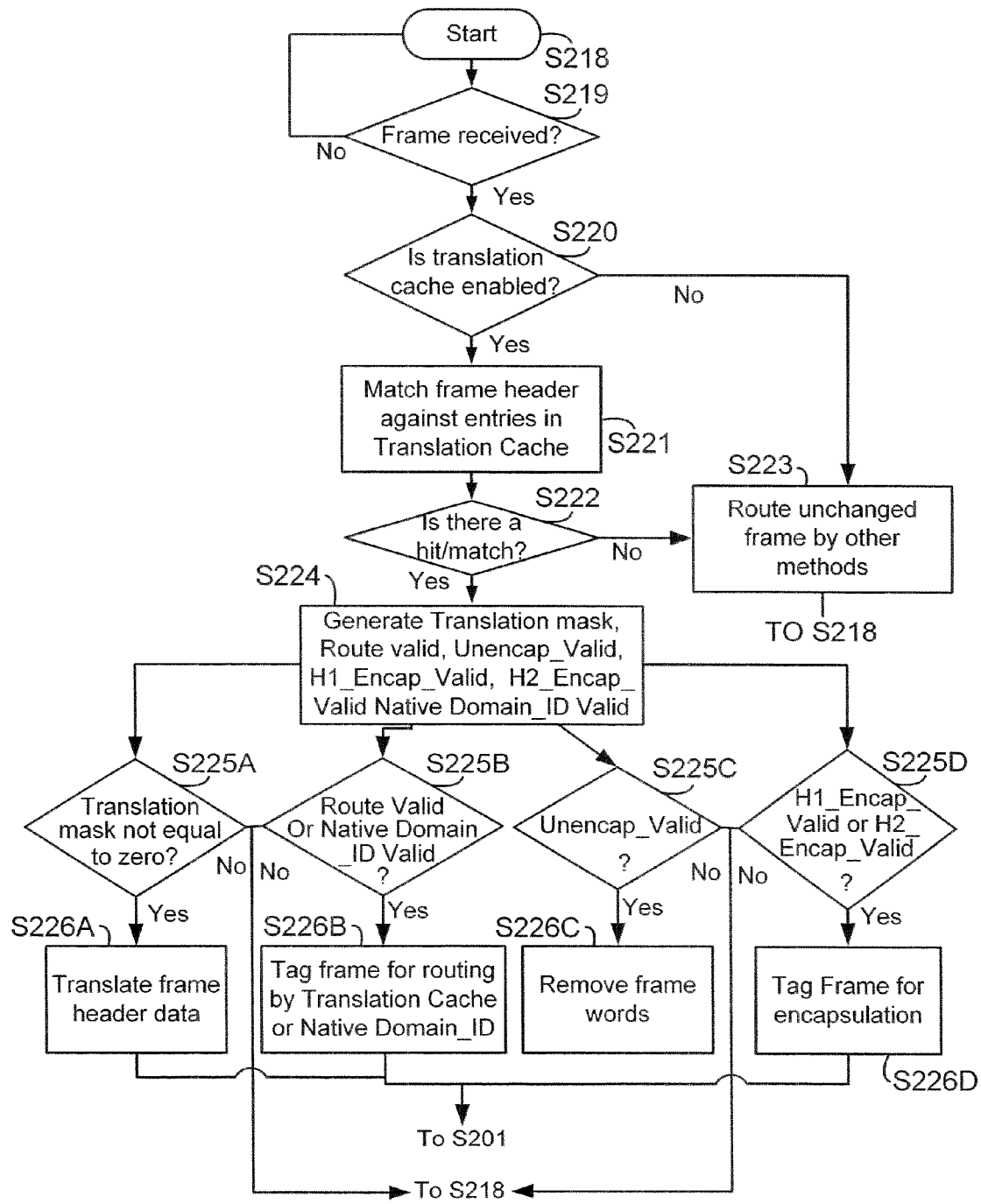
FIG. 2E shows a flow chart for performing address translation, header encapsulation and header de-encapsulation, according to one aspect of the present invention.

Process Flow:

FIG. 2E shows a process flow chart for performing header translation, header encapsulation, header de-encapsulation and for special routing of a frame, according to one aspect of the present invention.

In step S218, the process starts and RPORT 132 waits for a frame. In step S219, RPORT 132 determines if it has received a frame. If no, then the process reverts to step S218 If yes, then process moves to step S220.

In step S220, RPORT 132 determines if cache 206 is enabled. If cache 206 is not enabled, the process reverts to step S223

If cache 206 is enabled, then in step S221, the frame header (not shown) is matched against entries in cache 206 as described above with respect to FIG. 2D.

In step S222, RPORT 132 determines if there is a match/hit. If there is no match/hit, then the frame is routed in step S223, by other methods, without changing the frame header.

If there is hit, then in step S224, state machine 220 generates translation mask 220G, Route_valid signal 220D, Encap_H1_Valid signal 220I, Encap_H2_Valid signal 220K and Unencap_Valid signal 220B. The functionality of translation state machine 220 is described above with respect to FIG. 2D. Thereafter, Steps 225A, 225B, 225C and 225D are performed in parallel.

In step S225A, TPORT 130 determines if any of translation mask 220G bits are not equal to zero. If yes, then the frame header is translated (substituted) in step S226A. Receive pipeline 200 substitutes frame header information with translation data 202. Translation is performed on a frame header for bits that are not equal to zero in translation mask 220G. For example, if bit 4 and bit 7 are not equal to zero in translation mask 220D, then bit 4 and bit 7 of the frame header is substituted with bit 4 and bit 7 from translation data 202.

In step S225B, RPORT 132 determines if Route_Valid signal/command 220D is set/asserted. If yes, then in step S226B, the frame is tagged for routing by the method identified using sub-function code (240D)

In step S225C, RPORT 132 determines if Un_Encap_Valid signal/command 220B is set/asserted. If yes, then in step S226C data words in a frame header are removed. This step is further explained below with respect to FIG. 2F.

In step S225D, RPORT 132 determines if Encap_H1_Valid signal/command 220I or Encap_H2_Valid signal/command 220K is set/asserted. If yes, then in step 226D the frame is tagged for encapsulation. The encapsulation process is further explained in step S208 below with respect to FIG. 2F.

Thereafter, the process proceeds to step S201 described below with respect to FIG. 2F.

The process reverts back to step S218, if translation mask 220G bits are zero in step S225A; if Route_Valid signal 220D is not set/asserted in step S225B; if Uncap_Valid signal 220B is not set/asserted in step S225C; or if Encap_H1_Valid signal 220I/Encap_H2_Valid signal 220K signals are not set in step S225D.

Figure 2F:
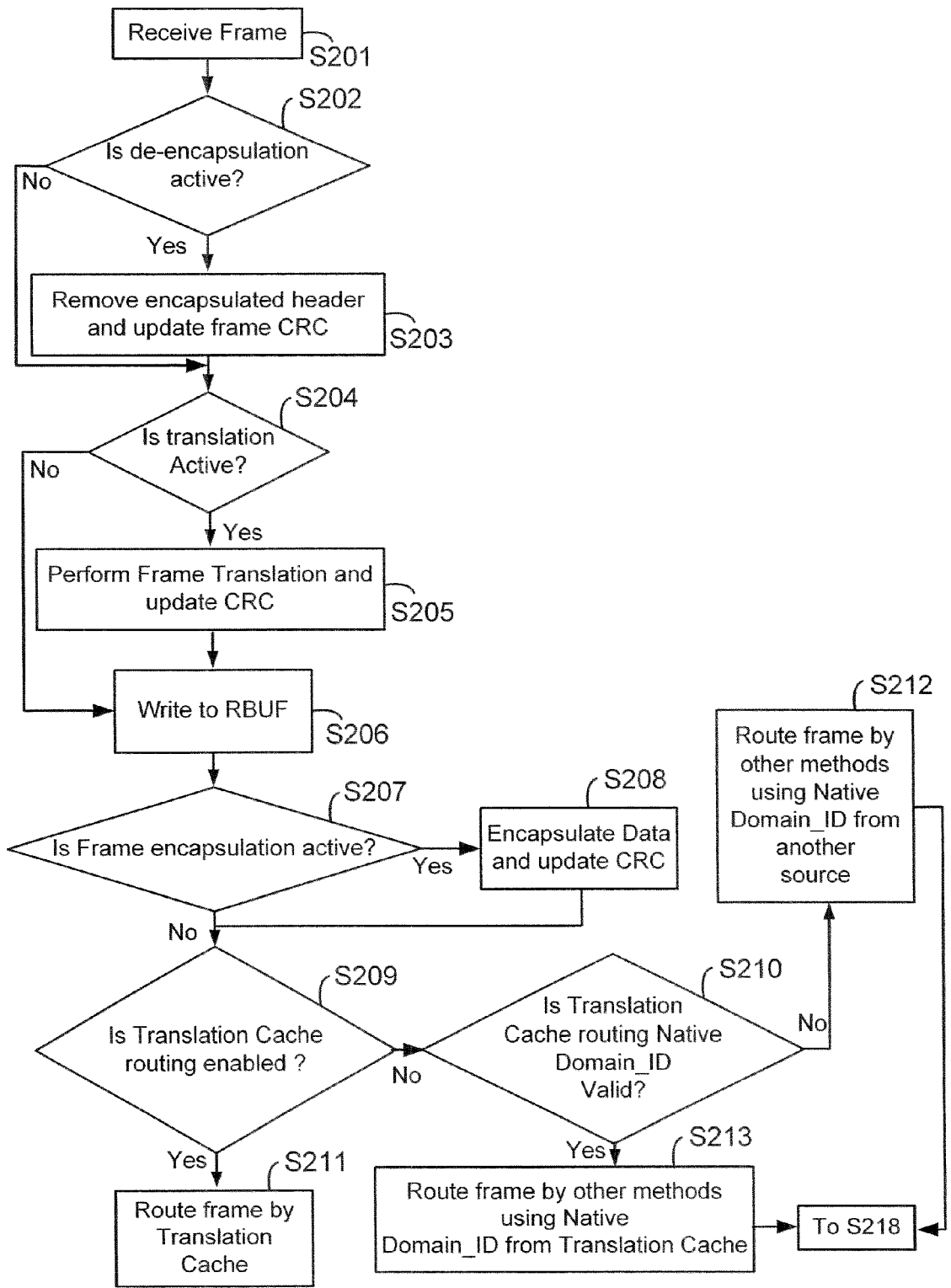
FIG. 2F shows a flow chart for processing received frames, according to one aspect of the present invention.

FIG. 2F shows a flow chart for processing frames that are received at RPORT 132, according to one aspect of the present invention.

In step S201, a frame is received by receive pipeline 200 at RPORT 132.

In step S202, RPORT 132 determines if de-encapsulation is active, i.e., Un_Encap_Valid signal/command 220B is set/asserted. As described above, Un_Encap_Valid signal/command 220B is generated by state machine 220. If Un_Encap_Valid signal 220B is not set, then the frame header is unchanged and the process proceeds to step S204.

If Un_Encap_Valid 220B is set, then in step S203, encapsulation header is removed. The number of data words to be removed is determined by Unencap_Code 220C. The frame is also updated with a new cyclic redundancy code ("CRC"). Every frame has a CRC code that is used for data integrity, and by updating the CRC, data integrity is ensured, especially when changes are made to frame headers.

Conventional switches use standard Fibre Channel frames for receiving and transmitting information. When a conventional switch from a VSAN or a Fabric receives frames, then the frame header has additional data words that need to be de-encapsulated so that the frame header is converted to a standard Fibre Channel frame header. According to one aspect of the present invention, the frame de-encapsulation feature enables conventional switches to connect to VSAN's or Fabrics.

In step S204, RPORT 132 determines if frame translation is active i.e., if any of the bits in translation mask are not equal to zero. If yes, then in step S205, frame translation is performed and CRC is updated. The details of address translation are described above in step S226A with respect to FIG. 2E.

According to one aspect of the present invention, frame header translation enables Fibre Channel frames to move between VSAN's and Fabrics. A Fibre Channel frame in a VSAN could be routed to another Fabric by translating the VSAN header to an IFR header. Similarly, an IFR Fibre Channel frame can be translated to a VSAN frame. The frame can be translated from one VSAN header to another VSAN header or similarly from one IFR header to a different IFR header.

In step S206, if frame translation in not set in step S204, then the unchanged frame is written into receive buffer (RBUF) 132A. If address translation is set in step S204, then the translated frame with updated CRC is written into RBUF 105 in step S206.

In step S207, the process determines if frame encapsulation is active. Frame encapsulation is active when signals/commands Encap_H1_Valid 220I or Encap_H2_Valid 220K are set/enabled.

If frame encapsulation is enabled, then in step S208, the frame is read from RBUF 132A and the frame is encapsulated with a frame header. If Encap_H1_Validsignal 220I is set/enabled, then the frame is encapsulated with H1_Data 220J. If Encap_H2_Validsignal 220K is set/enabled, then the frame is encapsulated with H2_Data 220K. The CRC of the frame is updated after the frame is encapsulated. Thereafter, the process proceeds to step S209.

In step S207, if frame encapsulation is not active, then the process moves to step S209.

Figures 2, 4A:
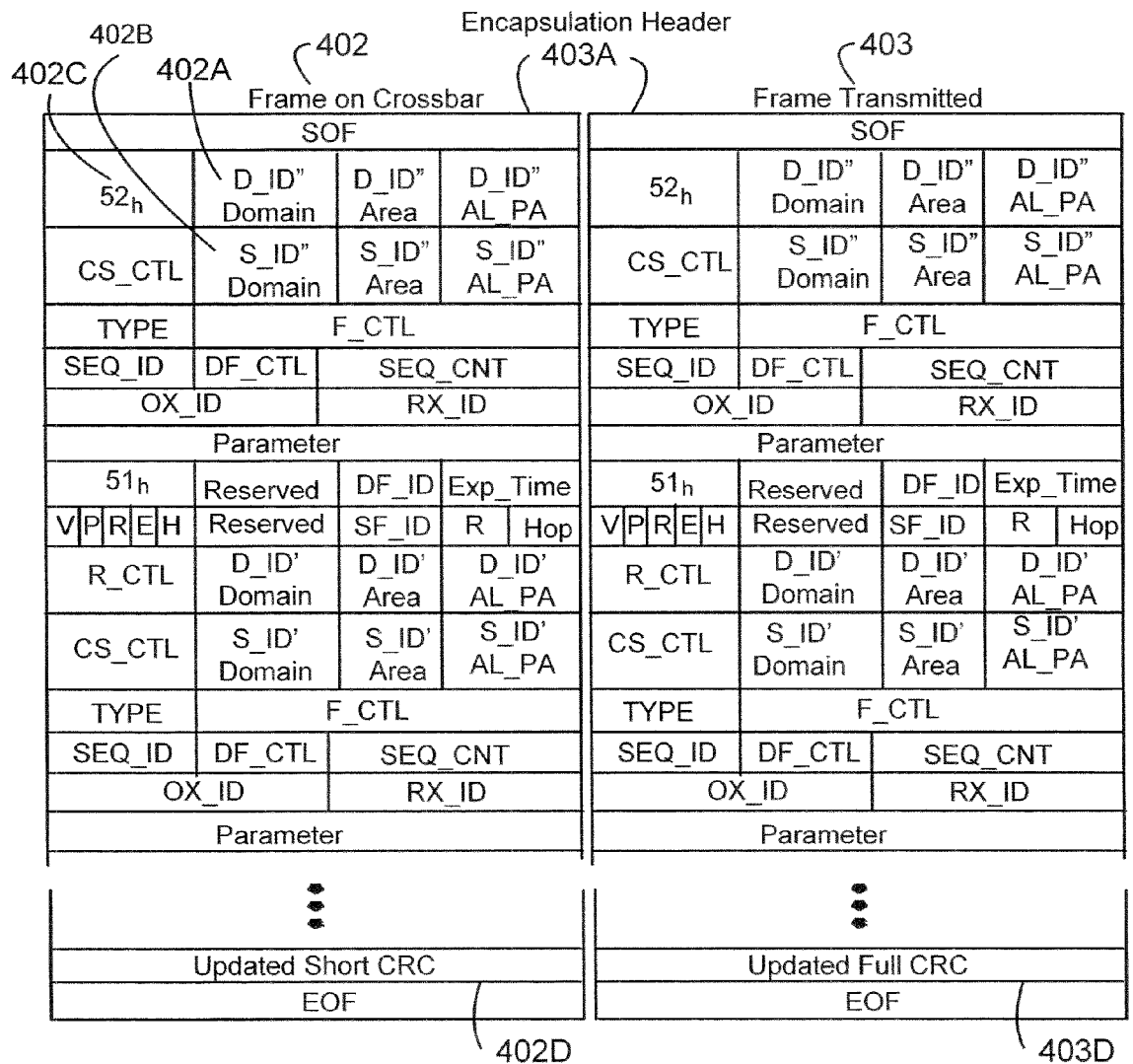
FIG. 4 shows an example for translating standard Fibre Channel Header to an Encapsulated header, according to one aspect of the present invention.
Figures 1, 4A:
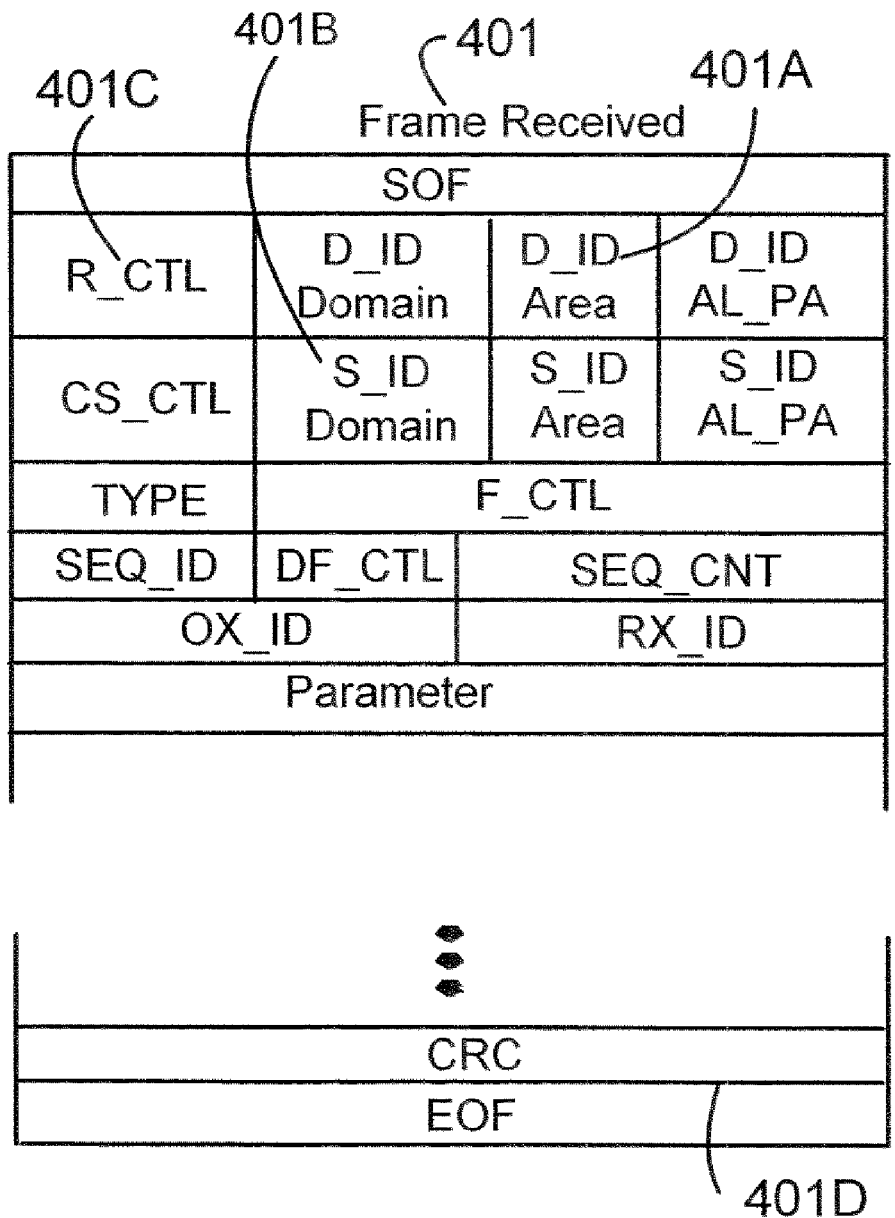

According to one aspect of the present invention, frame encapsulation enables standard switches and other devices to communicate with devices within VSANs and Fabrics. Conventional switches use only standard Fibre Channel frame headers. To route to a VSAN, a device needs to encapsulate the standard Fibre Channel header with a VSAN header. Moreover, the Fibre Channel frame can also be encapsulated with an IFR header, so that the frame could be routed to a Fibre Channel Fabric. FIG. 4A provides an example of the encapsulation process step.

In step S209, the process determines if translation cache routing is enabled. Translation cache routing is enabled if Route_Valid signal/command 220D is asserted/set.

In step S209, if translation cache routing is not enabled, then the process moves to step S210.

In step S209, if translation cache routing is enabled, then in step S211 the frame is routed by one of the methods described by Route_Code signal 220F using Route_Data 220F1. According to one aspect of the present invention, routing by translation cache enables a Fibre Channel switch to perform the functionality of a router.

In step S210, the process determines if Cache 202 Native Domain_ID is valid. If the Cache 202 Native Domain_ID is valid, then in step S213 the frame is routed by other means using Cache 202 generated Native Domain_ID in the ports routing state machine.

If Cache 202 Native Domain_ID is not valid in step S210, then in step S212, the frame is routed by other means using a Native Domain_ID from control registers else where in the port (not shown). Cache 202 Native Domain_ID is provided on signal Route_Data 220F1.

FIG. 3 shows a description of the Function Code 240D assignment (table 300) that is used to identify the translation action to perform, according to one aspect of the present invention.

Table 300 includes a column to represent function code 240D. Different bit values are used to indicate the different translation type. It is noteworthy that the bit values used for function code in table 300 are for illustration purposes only.

Column 302 shows a received header type and column 303 shows a transmitted header type. Column 304 describes the translation type that is performed. For example, if the function code (240D) is set to 00100, then column 302 indicates that a received header is a standard Fibre Channel header and column 303 indicates the transmitted header is an encapsulated header. Hence, a transmitted header is encapsulated.

FIG. 4A shows an example for translating a received standard Fibre Channel header 401 (similar to Frame Header 252) to a translated encapsulated header 403, according to one aspect of the present invention.

In this example, translation is based on function code 00100 as shown in table 300. A standard Fibre Channel frame that is received is routed to a Fabric in this example.

When a frame is received at RPORT 132 and if cache 206 is enabled, then a match is performed against all entries in the cache. A hit happens, if D_ID 401A of the received frame header matches with D_ID 243B of control word2 243. The received frame's CS_CTL field is sent to a state machine 220 along with function code 00100 and translation data 202.

In this example, state machine 220 generates a Trans_Mask 220G, Encap_H1_Valid 220I, H1_Data 220J Encap_H2_Valid 220K and H2_Encap_Data 220L. Bits corresponding to D_ID and S_ID are set in translation mask 220G as the fields that have to be translated.

Translation data 202 includes new D_ID 402A (same as 253B) and new S_ID 402B (same as 251A) values in the respective bit positions. D_ID 401A and S_ID 401B of the received frame are translated to new D_ID 402A and 402B values. R_CTL value in the received frame header is translated to a value of 52 h (shown as 402C) to indicate an IFR frame. The new frame header is then written into RBUF 132A. An updated CRC 402D is also calculated for the frame.

The frame is then read out of RBUF 132A and is tagged for encapsulation as signal Encap_H1_Valid 220I and Encap_H2_Valid220K are set/asserted in this example.

When the frame is ready to be transmitted out of TPORT 130, it is encapsulated with H2_Data 220L and H1_Data 220J. In this example, H2_Data 220L and H1_Data 220J are 128-bits of the extended IFR header 403A. Header 403A includes the updated D_ID 402A and S_ID 402B along with other fields like the Fabric destination ID (DF_ID) source ID (SF_ID). CRC value 403D is updated when the frame is transmitted out on TPORT 130.

The following provides an example of the Translation Data 202 word format for function code "$00100_b$" used in the above example:

| | | |
|---|---|---|
| Word 0 | bits 31-28 | Sub-function code |
| Word 0 | bits 27-24 | HopCt data |
| Word 0 | bits 23-12 | DF_ID data |
| Word 0 | bits 11-00 | SF_ID data |
| Word 1 | bit 31 | Valid (0 = Native ID <= CR0(31:24); 1 = Native ID <= Word 1 bits 7-0) |
| Word 1 | bits 30-26 | Column D port selection steering data |
| Word 1 | bits 25-20 | Column C port selection steering data (only bits 24-20 are used) |
| Word 1 | bits 19-14 | Column B port selection steering data (only bits 18-14 are used) |
| Word 1 | bits 13-08 | Column A port selection steering data (only bits 12-08 are used) |
| Word 1 | bits 07-00 | Native ID domain value |
| Word 2 | bit 31 | Reserved |
| Word 2 | bit 30 | Reserved |
| Word 2 | bits 29-28 | Version data |
| Word 2 | bit 27 | ETV data |
| Word 2 | bit 26 | D_ID' domain byte enable (0 = pass frame data; 1 = replace frame data) |
| Word 2 | bit 25 | D_ID' area byte enable (0 = pass frame data; 1 = replace frame data) |
| Word 2 | bit 24 | D_ID' AL_PA byte enable (0 = pass frame data; 1 = replace frame data) |
| Word 2 | bits 23-16 | D_ID' domain replacement data |
| Word 2 | bits 15-08 | D_ID' area replacement data |
| Word 2 | bits 07-00 | D_ID' AL_PA replacement data |
| Word 3 | bit 31 | Reserved |
| Word 3 | bits 30-28 | Priority data |
| Word 3 | bit 27 | HCV data |
| Word 3 | bit 26 | S_ID' domain byte enable (0 = pass frame data; 1 = replace frame data) |
| Word 3 | bit 25 | S_ID' area byte enable (0 = pass frame data; 1 = replace frame data) |
| Word 3 | bit 24 | S_ID' AL_PA byte enable (0 = pass frame data; 1 = replace frame data) |
| Word 3 | bits 23-16 | S_ID' domain replacement data |
| Word 3 | bits 15-08 | S_ID' area replacement data |
| Word 3 | bits 07-00 | S_ID' AL_PA replacement data |
| Word 4 | bits 31-00 | Reserved |
| Word 5 | bits 31-00 | Reserved |
| Word 6 | bits 31-24 | Reserved |
| Word 6 | bits 23-16 | D_ID" domain |

-continued

| | |
|---|---|
| encapsulation data | |
| Word 6 bits 15-08 | D_ID" area |
| encapsulation data | |
| Word 6 bits 07-00 | D_ID" AL_PA |
| encapsulation data | |
| Word 7 bits 31-24 | Reserved |
| Word 7 bits 23-16 | S_ID" domain |
| encapsulation data | |
| Word 7 bits 15-08 | S_ID" area |
| encapsulation data | |
| Word 7 bits 07-00 | S_ID" AL_PA |
| encapsulation data | |

Although the present invention has been described with reference to specific embodiments these embodiments are illustrative only and not limiting. Many other applications and embodiments of the present invention will be apparent in light of this disclosure and the following claims.

What is claimed is:

1. A method for processing frames in a Fibre Channel network comprising:
   (a) receiving a frame having a frame header with a plurality of fields at a receive segment of a port;
   (b) determining if a translation cache of the port is enabled and if enabled, simultaneously comparing the plurality of fields of the frame header with a plurality of entries for a plurality of control words used by the translation cache; wherein the plurality of control words include different fields for the simultaneous comparison with the plurality of fields of the frame header;
   (c) based on the simultaneous comparison in step (b) determining if there is a match between an entry of the received frame header and a control word entry; and
   (d) based on the match in step (c), removing data words in the received frame header, if de-encapsulation for the received frame is enabled; translating the received frame header using information generated by the translation cache, if translation for the received frame is enabled; encapsulating the frame with an encapsulation header, if encapsulation for the received frame is enabled; and routing the frame based on a translation cache setting if translation cache based routing for the frame is enabled.

2. The method of claim 1, further comprising:
   updating a cyclic redundancy code (CRC) when the frame is encapsulated, de-encapsulated or translated.

3. The method of claim 1, wherein the translating step further comprises:
   generating a translation mask with plural bits;
   generating translation data; and
   substituting data in the frame header with the translation data for bits set in the translation mask.

4. The method of claim 1, wherein the encapsulating step further comprises:
   generating an extended header; and
   encapsulating the received frame header with the extended header, if an encapsulation signal is active.

5. The method of claim 1, wherein the routing step further comprises:
   generating a route code to determine a method for routing, and
   routing the frame based of the route code, if a routing signal is active.

6. The method of claim 1, wherein the translation cache is enabled by a microprocessor.

7. The method of claim 1, wherein a receive pipeline is used to translate data in the frame header without using a microprocessor.

8. The method of claim 1, wherein the port processes an interleaved sequence of frames with different header categories.

9. A Fibre Channel switch element, comprising:
   a port having a receive segment for receiving and processing a Fibre Channel frame having a frame header with a plurality of fields; and
   a translation cache that is configured to simultaneous compare the plurality of fields within the frame header to a plurality of entries for a plurality of control words used by the translation cache; wherein the plurality of control words include different fields for the simultaneous comparison with the plurality of fields of the frame header; and based on the simultaneous comparison, de-encapsulates the Fibre Channel frame header, if de-encapsulation for the Fibre Channel frame is enabled; translates the Fibre Channel frame header using information generated by the translation cache, if translation for the Fibre Channel frame is enabled; encapsulates the frame, if encapsulation for the Fibre Channel frame is enabled; and routes the frame using an entry of the translation cache if routing for the Fibre Channel frame by the translation cache is enabled.

10. The Fibre Channel switch element of claim 9, wherein a cyclic redundancy code (CRC) is updated when the frame is encapsulated, de-encapsulated or translated.

11. The Fibre Channel switch element of claim 9, wherein to translate the frame header, the translation cache generates a translation mask which includes plural bits; generates translation data; and substitutes the frame header data with the translation data for bits that are set in the translation mask.

12. The Fibre Channel switch element of claim 9, wherein the translation cache generates an extended header and the frame header is encapsulated with the extended header.

13. The Fibre Channel switch element of claim 9, wherein the translation cache generates a route code to determine a method for routing; and the Fibre Channel frame is routed based on the route code.

14. The Fibre Channel switch element of claim 9, wherein the translation cache is enabled by a microprocessor.

15. The Fibre Channel switch element of claim 9, wherein a receive pipeline is used to translate the frame header without using a microprocessor.

16. A switch element, comprising:
   a port having a receive segment for receiving a frame with a frame header having a plurality of fields and a transmit segment for transmitting the frame; and
   a translation cache that is configured to simultaneously compare the plurality of fields of the frame header to a plurality of entries for a plurality of control words used by the translation cache; wherein the plurality of control words include different fields for the simultaneous comparison with the plurality of fields of the frame header; and based on the simultaneous comparison, the frame header is de-encapsulated, if de-encapsulation for frame is enabled; translated, if translation for the frame is enabled; encapsulated, if encapsulation for the frame is enabled; and routed by using an entry of the translation cache, if the routing for the frame by the translation cache is enabled;
   wherein to translate the frame header, the translation cache generates a translation mask with a plurality of bits; generates translation data; and substitutes frame header data with the translation data;

wherein to encapsulate the frame header, the translation cache generates an extended header and the frame header is encapsulated with the extended header; and wherein to route the frame, the translation cache generates a route code and the frame is routed based on the route code.

17. The switch element of claim 16, wherein the translation cache is enabled by a microprocessor for the switch element.

* * * * *

UNITED STATES PATENT AND TRADEMARK OFFICE
CERTIFICATE OF CORRECTION

PATENT NO. : 7,613,816 B1            Page 1 of 2
APPLICATION NO. : 11/560317
DATED : November 3, 2009
INVENTOR(S) : Frank R Dropps et al.

It is certified that error appears in the above-identified patent and that said Letters Patent is hereby corrected as shown below:

In column 2, line 11, delete "GL_Forts" and insert -- GL_Ports --, therefor.

In column 2, line 59, delete "("FC-FS-2")" and insert -- ("FC-FS-2"): --, therefor.

In column 4, line 14, delete "(E_Ports)" and insert -- (E_Ports). --, therefor.

In column 4, line 24, delete "102" and insert -- 102. --, therefor.

In column 4, line 53, delete "design" and insert -- design. --, therefor.

In column 5, line 18, delete "LOP" and insert -- IOP --, therefor.

In column 5, line 21, delete "shown)" and insert -- shown). --, therefor.

In column 5, line 56, delete "XC_Port" and insert -- XG_Port --, therefor.

In column 6, line 61, delete "specification)" and insert -- specification). --, therefor.

In column 7, line 13, delete "devices" and insert -- devices. --, therefor.

In column 7, line 18, delete "S_TD" and insert -- S_ID --, therefor.

In column 8, line 59, delete "2D" and insert -- 2D. --, therefor.

In column 9, line 14, delete "("Tx Trans_Req")" and insert -- ("Tx_Trans_Req") --, therefor.

In column 10, line 6, delete "239'." and insert -- 239C. --, therefor.

In column 11, line 52, delete "220D," and insert -- 220G, --, therefor.

In column 12, line 55, delete "105" and insert -- 205 --, therefor.

Signed and Sealed this

Nineteenth Day of October, 2010

David J. Kappos
*Director of the United States Patent and Trademark Office*

CERTIFICATE OF CORRECTION (continued)
U.S. Pat. No. 7,613,816 B1

In column 15, line 16, delete "embodiments" and insert -- embodiments, --, therefor.

In column 15, in claim 1, line 23, delete "network" and insert -- network, --, therefor.

In column 15, in claim 5, line 62, delete "routing," and insert -- routing; --, therefor.

In column 15, in claim 5, line 64, delete "of the" and insert -- on the --, therefor.